United States Patent
Maiocco et al.

(10) Patent No.: US 7,814,201 B2
(45) Date of Patent: *Oct. 12, 2010

(54) SYSTEM AND METHOD FOR MONITORING GLOBAL NETWORK PERFORMANCE

(75) Inventors: James N. Maiocco, Seattle, WA (US); Bradley M. Belanger, Seattle, WA (US); Brian E. Mansell, Seattle, WA (US); John A. McCaskey, Seattle, WA (US)

(73) Assignee: Compuware Corporation, Detroit, MI (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/344,785

(22) Filed: Dec. 29, 2008

(65) Prior Publication Data

US 2009/0245122 A1    Oct. 1, 2009

Related U.S. Application Data

(63) Continuation of application No. 10/826,548, filed on Apr. 16, 2004, now Pat. No. 7,478,151, which is a continuation of application No. 10/764,276, filed on Jan. 23, 2004, now abandoned.

(60) Provisional application No. 60/442,021, filed on Jan. 23, 2003, provisional application No. 60/442,023, filed on Jan. 23, 2003, provisional application No. 60/453,686, filed on Mar. 11, 2003, provisional application No. 60/492,472, filed on Aug. 5, 2003.

(51) Int. Cl.
    *G06F 15/173*    (2006.01)
(52) U.S. Cl. .................. 709/224; 370/252; 709/223
(58) Field of Classification Search ................ 709/223, 709/224; 370/252; 702/188; 715/736
    See application file for complete search history.

(56) References Cited

U.S. PATENT DOCUMENTS 6,664,978 B1 * 12/2003 Kekic et al. .................. 715/733
6,801,940 B1 * 10/2004 Moran et al. ................. 709/224

* cited by examiner

*Primary Examiner*—Frantz B Jean
(74) *Attorney, Agent, or Firm*—Fenwick & West LLP

(57) ABSTRACT

The present invention provides a system and method for monitoring global network performance across a public Wide Area Network (WAN), and/or private networking through a secure IPSec gateway, and providing a user interface for performance metrics through a secure Internet browser.

14 Claims, 34 Drawing Sheets

Edit Monitor

Functionality
    Polling: ☑
    Notifications: ☐
Primary Contact
    Primary Email: [          ]
    Primary Pager: [          ]
Secondary Contact
    Email: [          ]
    Pager: [          ]
Tertiary Contact
    Email: [          ]
    Pager: [          ]
Escalation Delay
    Primary Level: [0 ▼]
    Secondary Level: [0 ▼]
    Tertiary Level: [0 ▼]
Thresholds:
    High: [-1]
    Low: [-1]

[Update Monitor]

*FIG. 10*

| | Alias | IP Address | ISP | Type | Location | Monitors | | |
|---|---|---|---|---|---|---|---|---|
| | | | | | | Alias | Type | Polling Alert |
| | | | | | | ○ CPU Utilization | snmp | ☐ |
| D | | | | | | ○ Inbound Errors | snmp | ☐ |
| e | | | | | | | | |
| v | ○ Cisco Router | 64.38.175.161 | Verio | Router | Seattle, WA | ○ Incoming Traffic | snmp | ☐ |
| i | | | | | | ○ Outbound Errors | snmp | ☐ |
| c | | | | | | | | |
| e | | | | | | ○ Outgoing Traffic | snmp | ☐ |
| s | | | | | | ○ Ping Connectivity | connectivity | ☐ |

[Edit Device]  [Edit Monitor]
1102

*FIG. 11*

Add Group

Group Alias: [          ]  [Add Group]

Edit Groups

Group Alias:
[Router Errors]

Cisco Router - Incoming Traffic
Cisco Router - CPU Utilization
Cisco Router - Inbound Errors
Cisco Router - Outbound Errors

[Update Group]

Preview Group

Group Alias: [Router Errors ▼]  [Preview Group]

Delete Group

Group Alias: [Router Errors ▼]  [Delete Group]

FIG. 12

| Technical Contact | Billing Contact |
|---|---|
| Name: John Smith | Name: John Smith |
| Email Address: john.smith@email.com | Email Address: john.smith@email.com |
| Phone Number: 123-345-4567 | Phone Number: 123-345-4567 |
| Mobile Number: 123-345-4567 | Mobile Number: 123-345-4567 |
|  | Address: 1111 14th Ave W #5 |
|  | Address (Optional): |
|  | City, State: Seattle, WA |
|  | Zip Code: 98119 |
| [Edit Technical Contact]  [Change Password]  [Edit Billing Contact] | |

Name: [Brian Mansell]
Email Address: [john.smith@email.com]
Phone Number: [123-345-4567]
Mobile Number: [123-345-4567]
Email Address: [1111 14th Ave W #5]
Address (Optional): [         ]
City, State: [Seattle] [WA]
Zip Code: [98119]

[Update Billing Contact]

FIG. 13

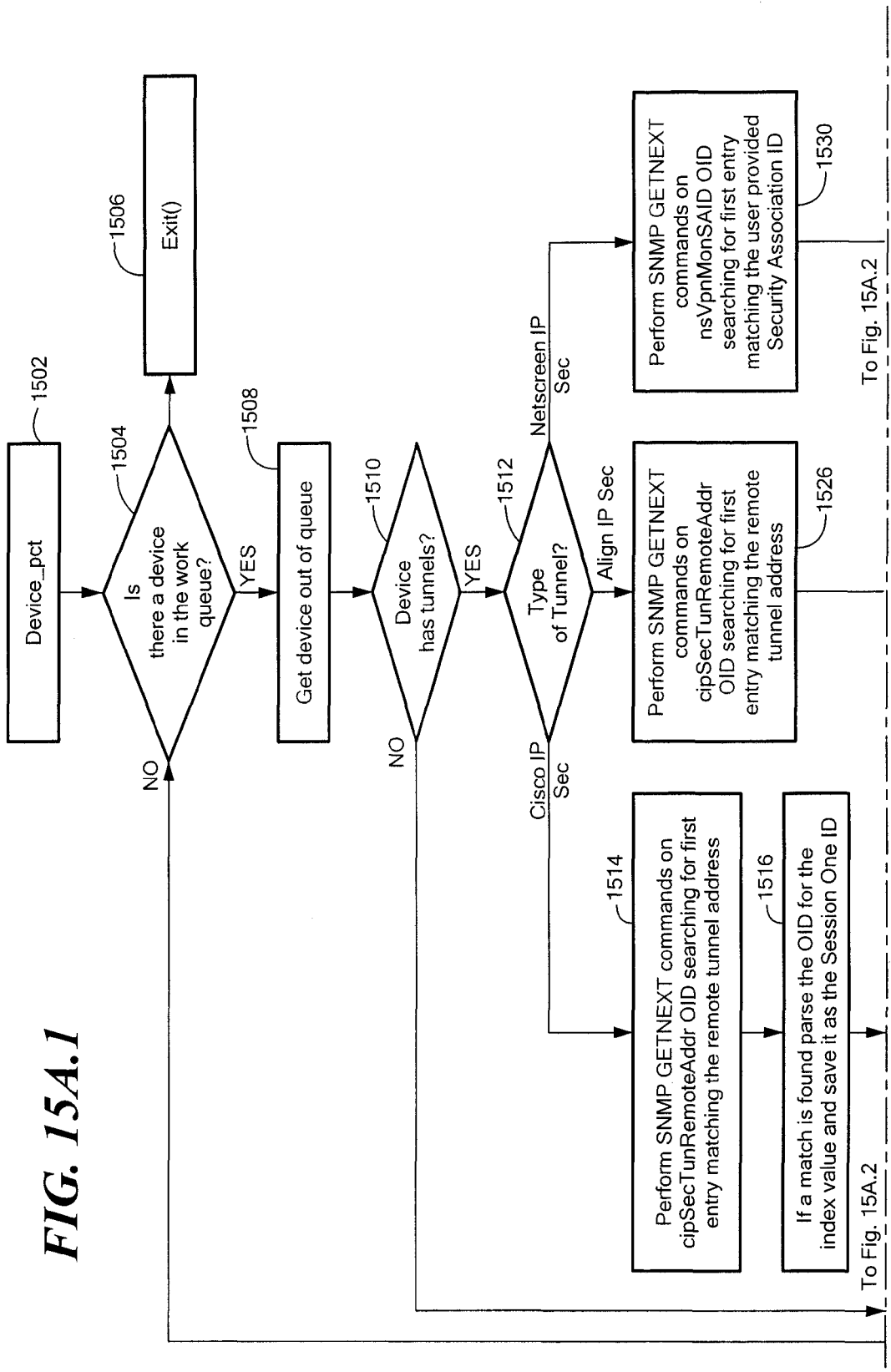
FIG. 15A.1

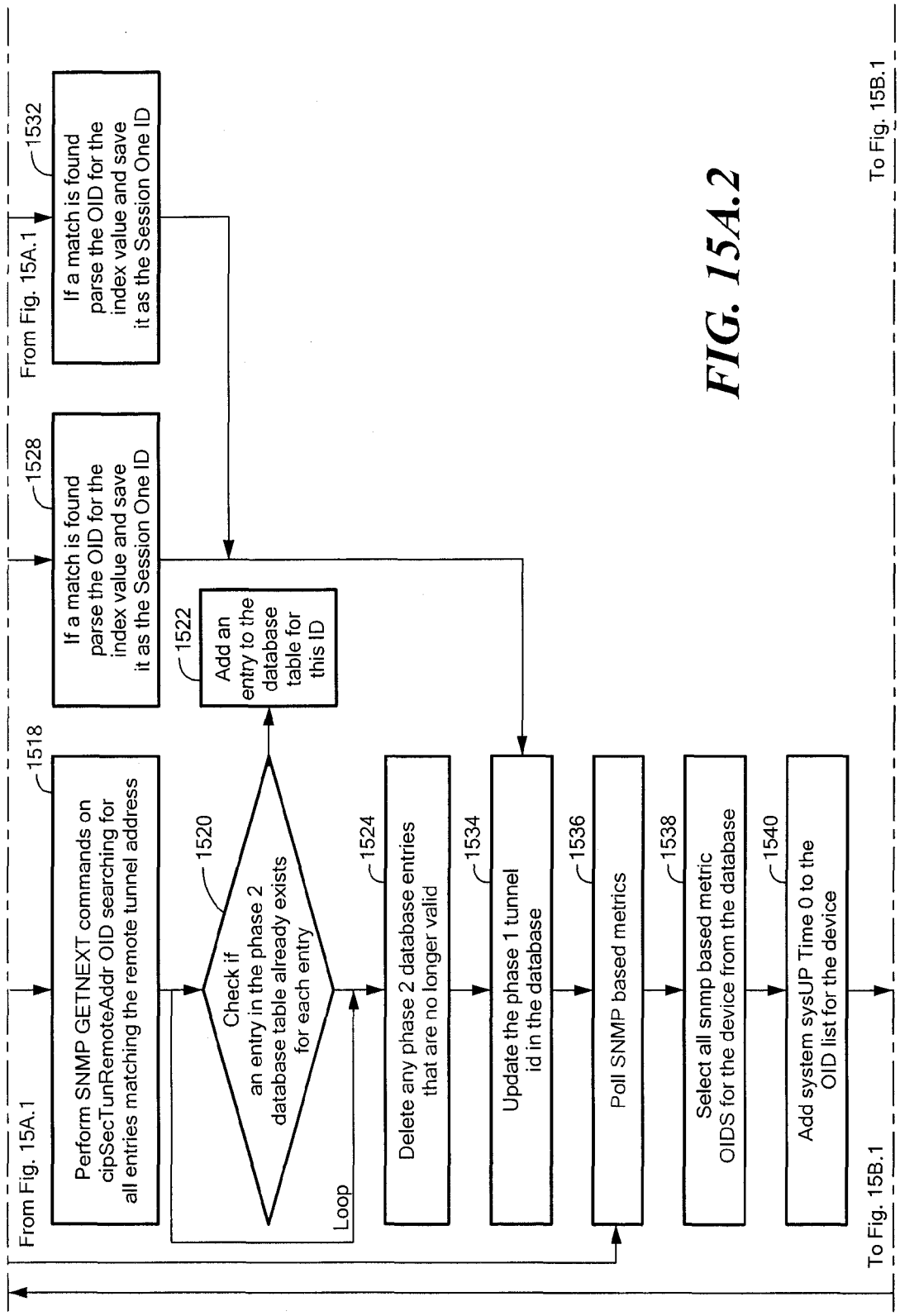
FIG. 15A.2

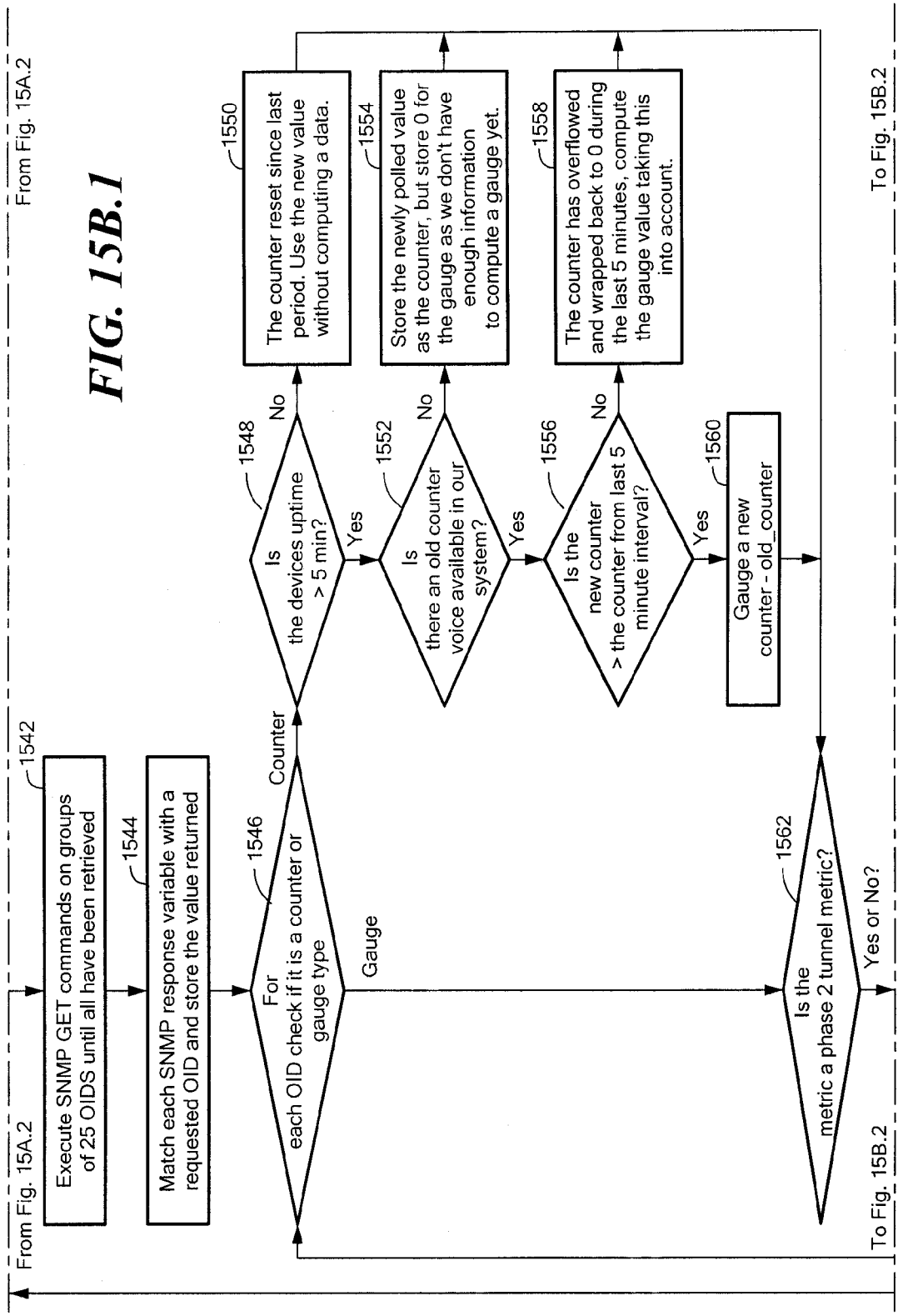
FIG. 15B.1

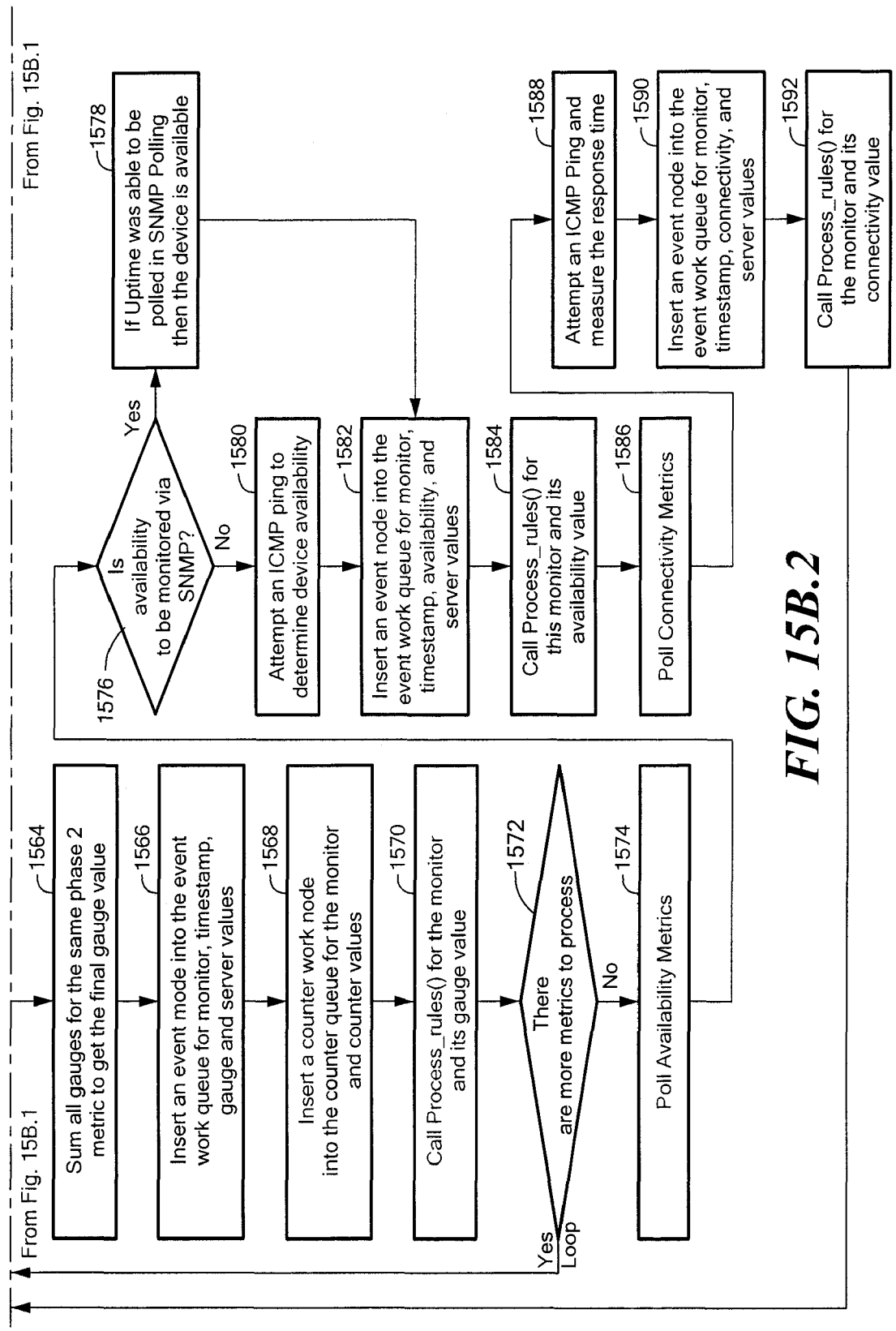
FIG. 15B.2

FIG. 24

Notifications

| Selected | Device Alias | Monitor Alias | Polling | Alerts | Thresholds |
|---|---|---|---|---|---|
| ○ | Cisco PIX 501 | Connections | • | • | • Static |
| ○ | Cisco PIX 501 | CPU Utilization | • | • | • Static |
| ○ | Cisco PIX 501 | Memory - Available | • | • | • Static |
| ○ | Cisco PIX 501 | Memory - Used | • | | • Static |
| ○ | Cisco PIX 501 | Packet Errors - Inbound | • | | |
| ○ | Cisco PIX 501 | Packet Errors - Outbound | • | | |
| ○ | Cisco PIX 501 | Ping Connectivity | • | | |
| ○ | Cisco PIX 501 | Traffic - Inbound | • | | • Static |
| ○ | Cisco PIX 501 | Traffic - Inbound - Higher Layer - Non-Unicast | • | | |
| ○ | Cisco PIX 501 | Traffic - Inbound - Higher Layer - Unicast | • | | |
| ○ | Cisco PIX 501 | Traffic - Outbound | • | | |
| ○ | Cisco PIX 501 | Traffic - Outbound - Higher Layer - Non-Unicast | • | • | |
| ○ | Cisco PIX 501 | Traffic - Outbound - Higher Layer - Unicast | • | | |
| ○ | Cisco PIX 515 | Connections | • | | |
| ○ | Cisco PIX 515 | CPU Utilization | • | | |
| ○ | Cisco PIX 515 | Memory - Available | • | | |
| ○ | Cisco PIX 515 | Memory - Used | • | | |
| ○ | Cisco PIX 515 | Packet Errors - Inbound | • | | |
| ○ | Cisco PIX 515 | Packet Errors - Outbound | • | | |
| ○ | Cisco PIX 515 | Ping Connectivity | • | | |
| ○ | Cisco PIX 515 | Traffic - Inbound | • | | |
| ○ | Cisco PIX 515 | Traffic - Inbound - Higher Layer - Non-Unicast | • | | |
| ○ | Cisco PIX 515 | Traffic - Inbound - Higher Layer - Unicast | • | | |
| ○ | Cisco PIX 515 | Traffic - Outbound | • | | |
| ○ | Cisco PIX 515 | Traffic - Outbound - Higher Layer - Non-Unicast | • | | |
| ○ | Cisco PIX 515 | Traffic - Outbound - Higher Layer - Unicast | • | | |

[ Notification Settings ] [ Static Thresholds ]

FIG. 25

Edit Notification Settings

Cisco PIX 501   Connections

Functionality
Polling: ☑
Notifications: ☑
Static Thresholds: ☑

Primary Contact
Email: [          ]
Pager: [          ]

Secondary Contact
Email: [          ]
Pager: [          ]

Tertiary Contact
Email: [          ]
Pager: [          ]

Escalation Delay
Primary Level: [0 ▼]
Secondary Level: [0 ▼]
Tertiary Level: [0 ▼]

[ Update Notification Settings ] [ Cancel ]

Static Thresholds

Cisco PIX 501  CPU Utilization

High (percent): [15]
Low (percent): [60]

[Update Static Thresholds] [Cancel]

*FIG. 26*

Device Manager

| Selected | Alias | IP Address | ISP | Type | Location |
|---|---|---|---|---|---|
| ○ | Cisco Router | 64.38.175.161 | Verio | Router | Seattle, WA |

[Edit Device Attributes]

*FIG. 27*

Edit Device Attributes

Alias: [Cisco Router]
IP Address: [64.38.175.161]
ISP: [Verio]
Type: [Router]
Location: [Seattle, WA]

[Update Device Attributes] [Cancel]

*FIG. 28*

Alert Rules

| Day(s) | Time | Threshold Type | Threshold | Metric(s) |
|---|---|---|---|---|
| ● All Week | All Day | Cumulative | exceeds 45.00 percent for 40% of polling periods over 15 hours | Orange Router - CPU Utilization |
| ○ All Week | All Day | Static | exceeds 45.00 percent | Cisco Router - CPU Utilization |
| ○ All Week | All Day | Variable | Increases by a unit value of 13.67 kbps over 14 hours | dev01 - eth3 - Inbound Traffic<br>dev01 - interface - Inbound Traffic |
| ○ All Week | All Day | Variable | Increases by a percentage value of 45% over 11 hours | Cisco Router - External - Inbound Traffic<br>dev01 - interface - Inbound Traffic |

*FIG. 30B*

Threshold: [Static ▼]

If metric [exceeds ▼] [1.75] [bps ▼] during a polling period.

*FIG. 31A*

Threshold: [Standard Deviation ▼]

If current metric values [exceeds ▼] mean +/- [1.75] standard deviations as evaluated over the past [14 ▼] [days ▼]

*FIG. 31B*

Threshold: Variable ▼

If current metric | increases ▼ | by a | percentage ▼ | value of | 45 | % from the average value calculated over the past | --- ▼ | hours ▼

*FIG. 32A*

Threshold: Variable ▼

If current metric | increases ▼ | by a | unit ▼ | value of | 45 | percent from the average value calculated over the past | --- ▼ | hours ▼

*FIG. 32B*

Threshold: Cumulative ▼

If tunnel is | unavailable ▼ | for | 50% ▼ | of polling periods over | 6 ▼ | days ▼

Notifications

Add Alert Rule

Intelligent. Proactive. Secure.™

Metric Type: ○ Device ● Interface

Metric Alias: [Inbound Traffic ▼]

Interfaces:
- ☑ XLON Test Router - 134
- ☑ XLON Test Router - 129
- ☐ Cisco Router (Cairncross) - External
- ☑ dev01 - eth2
- ☑ dev01 - eth3

Time Frame: [12AM ▼] - [12AM ▼]  ☐ All Day

Days: ☐ Mon ☐ Tue ☐ Wed ☐ Thu ☐ Fri ☐ Sat ☐ Sun ☐ All Week

Threshold: [Static ▼]

If metric [exceeds ▼] [23] [mbps ▼] during polling period.

Email:

Mobile Email:

Primary Escalation:

Escalation Delay: [0 ▼] minutes

FIG. 43

SYSTEM AND METHOD FOR MONITORING GLOBAL NETWORK PERFORMANCE

CROSS-REFERENCE TO RELATED APPLICATIONS

This application is a continuation of U.S. patent application Ser. No. 10/826,548, filed Apr. 16, 2004 now U.S. Pat. No. 7,478,151, which is a continuation of U.S. patent application Ser. No. 10/764,276, filed Jan. 23, 2004, now abandoned which claims the benefit of U.S. Provisional Application No. 60/442,021, filed Jan. 23, 2003, U.S. Provisional Application No. 60/442,023, filed Jan. 23, 2003, U.S. Provisional Application No. 60/453,686, filed Mar. 11, 2003, and U.S. Provisional Application No. 60/492,472, filed Aug. 5, 2003, all of which are relied on and incorporated by reference.

BACKGROUND OF THE INVENTION

During the past 10 years, companies have made significant investments to configure robust networks to support burgeoning applications, transactions and communications over the Internet. Yet, the majority of tools to support network operations have been focused on internal Local Area Networks (LANs), despite the demand to support external business applications. As a result, Global Networks have been managed locally without a clear picture of performance, operational requirements, or the allocation of network resources across multiple Internet Service Providers (ISPs).

Further, the internal hardware, software and traps, typically used in the prior art to gather network intelligence, has only limited application across the diverse network segments that today make up an enterprise's Global Network, such as data (including Internet Protocol (IP)), wireless (including Wireless Access Point (WAP) access and equipment), voice (including Voice over Internet Protocol (VoIP)) and Virtual Private Networks (VPNs). Different sets of tools have been required to monitor each of these different segment types.

Accordingly, there is a need to gauge the performance of Global Networks, including ISP quality of service and device performance from a single integrated interface across diverse network segments.

The present invention answers this need by enabling clients to remotely monitor disparate networks and service providers over a real-time Wide Area Network (WAN)-based interface without displacing internal management applications.

SUMMARY OF THE INVENTION

Generally described, the present invention relates to a fully-managed Application Service Provider (ASP)-based system to monitor global network performance across Data, Wireless, Voice over IP (VoIP), and Virtual Private Networks (VPN) from a single user interface.

It is thus an object of the present invention to provide a global network monitoring system that can operate in a distributed networking environment, across multiple service providers, and support any Simple Network Management Protocol (SNMP)-enabled device.

Another object of the present invention is to provide a global network monitoring system that utilizes embedded network protocols and the flexibility and reliability of the public Internet to collect and disseminate client data.

A further object of the present invention is to provide a global network monitoring system that is completely maintained and managed, and thus does not require a client to purchase, install, or maintain any hardware, software, agents, or plug-ins.

Another object of the present invention is to provide a global network monitoring system that allows a client to retain complete control over its network.

A still further object of the present invention is to provide a global network monitoring system that delivers a real-time view of global Internet access services and networking equipment from a single web interface.

Yet another object of the present invention is to provide a global network monitoring system that offers standardized device and interface statistics across disparate networks to enable the client to evaluate Service Level Agreements (SLAs), device performance, bandwidth utilization, and to aid the client in strategic planning.

Another object of the present invention is to provide a global network monitoring system for dedicated VPNs that delivers a real-time view of VPN device performance, VPN tunnel availability, VPN tunnel health statistics, and point-to-point VPN tunnel latencies.

A still further object of the present invention is to provide a global network monitoring system that correlates VPN tunnel sessions across heterogeneous network environments.

Another object of the present invention is to provide a global network monitoring system that delivers a real-time view of the performance of Wireless Access Point (WAP) equipment, including device availability, wireless traffic statistics over monitored equipment, wireless signal strength, wireless Quality of Service (QOS), and data about remote wireless users to ensure that sufficient upstream bandwidth exists to support cost effective provisioning of the equipment needed to power the wireless networks.

A still further object of the present invention is to provide a global network monitoring system that enables the client to customize and save performance data for groups of devices based on multiple criteria, to dynamically graph and compare performance statistics, and to sort performance data based on device criteria (e.g., make, model, type, or alias), location (e.g., continent, country, state/province, city, or custom alias), Internet Service Provider (ISP) (e.g., alias, circuit type), or any combination thereof.

Yet another object of the present invention is to provide a global network monitoring system that delivers proactive alerts which predict failures and notify responsible parties before a network event impacts mission-critical operations.

Another object of the present invention is to provide a global network monitoring system that delivers customized performance reports.

A further object of the present invention is to provide a global network monitoring system that is scalable and cost-effective.

Other objects, features, and advantages of the present invention will become apparent upon inspection of the following detailed description of the preferred embodiment of the invention, taken in conjunction with the drawings and appended claims.

BRIEF DESCRIPTION OF THE DRAWINGS

FIG. 10 is a GUI showing an Edit Monitor interface available from a "Device Manager" menu in an embodiment of the present invention.

FIG. 11 is a GUI for setting device attributes and monitor alert/threshold setting in an embodiment of the present invention.

FIG. 12 is a GUI showing a "Group Manager" for devices being monitored in an embodiment of the present invention.

FIG. 13 is a GUI showing an Account interface in an embodiment of the present invention.

FIGS. 15A.1-15B.2 is a flow diagram of a Device polling process in an embodiment of the present invention.

FIG. 24 is a GUI for selections notifications based on metrics of monitored devices in an embodiment of the present invention.

FIG. 25 is a GUI for editing notification settings in an embodiment of the present invention.

FIG. 26 is a GUI for establishing static thresholds for testing a monitor's values in an embodiment of the present invention.

FIG. 27 is a GUI for selecting and viewing a device in Device Manager in an embodiment of the present invention.

FIG. 28 is a GUI for editing device attributes in Device Manager in an embodiment of the present invention.

FIG. 30B is a GUI for managing notification alert rules in an embodiment of the invention.

FIG. 31A is a GUI for setting static thresholds for notification in an embodiment of the present invention.

FIG. 31B is a GUI for setting standard deviation thresholds for notification in an embodiment of the present invention.

FIG. 32A is a GUI for setting variable thresholds for notification in an embodiment of the present invention.

FIG. 32B is a GUI for setting variable thresholds for notification in an embodiment of the present invention.

FIG. 33 is a GUI for setting cumulative thresholds for notification in an embodiment of the invention.

FIG. 43 is a GUI for applying notification alert rules in an embodiment of the present invention.

DETAILED DESCRIPTION OF THE INVENTION

Figures 1, 2:
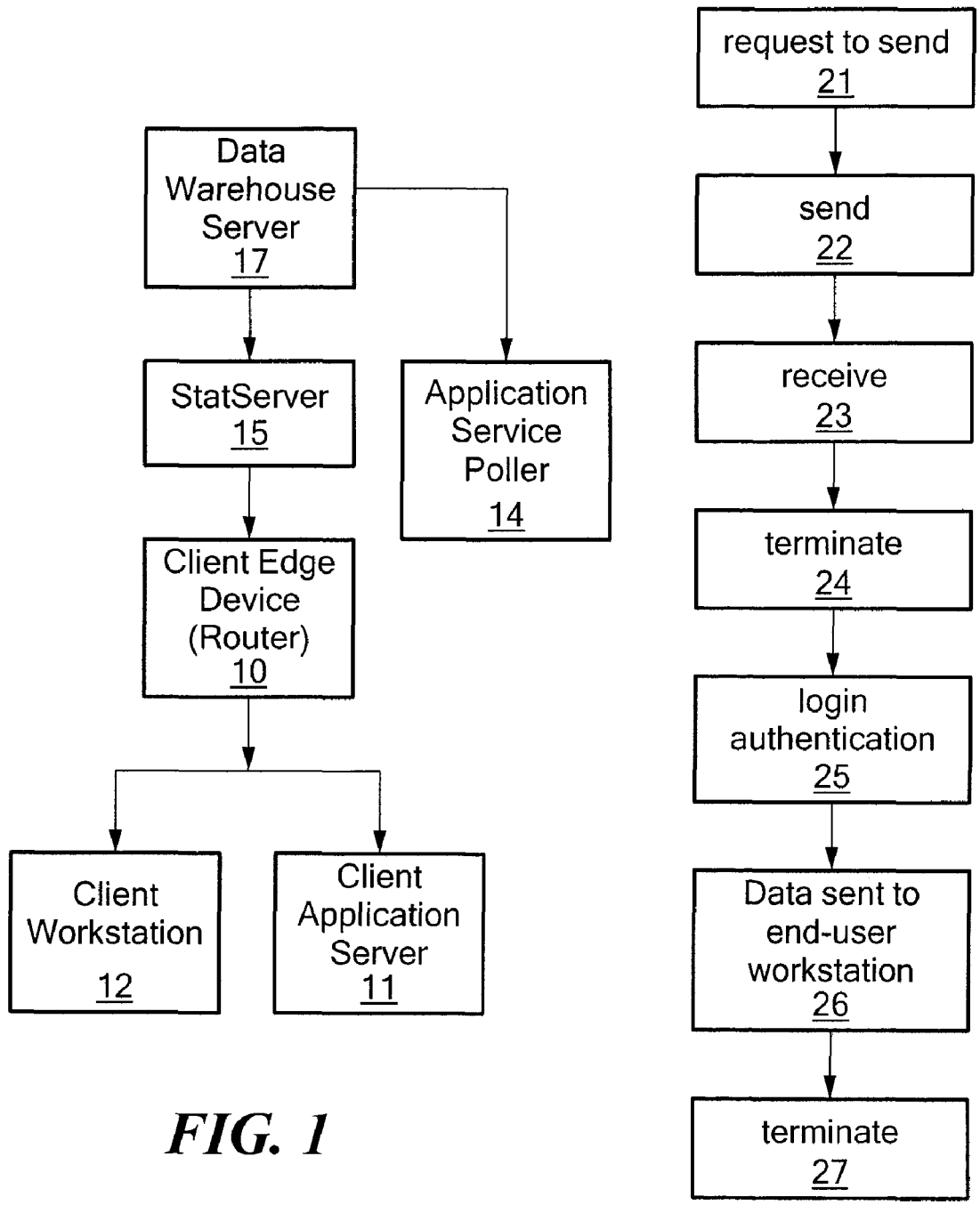
FIG. 1 is a block relational diagram showing a global network monitoring system in an embodiment of the present invention.
FIG. 2 is a flow diagram of the StatScope process in an embodiment of the present invention.

Referring to FIG. 1, in an embodiment for monitoring global Internet access services and networking equipment, hereinafter referred to as StatScope or the StatScope process, the present invention provides a system and method of enabling communications between a network device and application servers, a storage server computer and an end-user workstation. FIG. 1 provides a high-level architecture of a data network monitoring and management system in an embodiment of the invention.

The device 10 is preferably a network router or workstation which operates according to the Internet Protocol (IP). Devices monitored by the system must have SNMP-get read permissions enabled and be visible to servers by establishing grant permissions on the user's firewall or establishing a VPN link between the client and the StatServer and/or Application Polling Server.

The storage server computer is preferably a UNIX platform.

The client workstation 12 is preferably a Windows (95, 98, 2000, ME, NT, XP), UNIX, or Macintosh workstation operating Internet web browser software. In the described embodiment, the StatScope User Interface (UI) requires a minimum of Internet Explorer 5.0/NS 6, and preferably at least Internet Explorer 6. It will be appreciated, however, that future versions of the aforementioned browsers, custom browsers or similar interfaces are encompassed by the present invention.

In an embodiment of the invention, the client console also provides 128 bit SSL secured logins into the system. In one embodiment the use of Secure Sockets Layer (SSL) for plots/table metrics is avoided because SSL taxes the server's performance and is unnecessary for providing statistics to the user. Encrypted session IDs are used in conjunction with browser cookies to verify user sessions when charting plots in alert emails and utilizing various components of the client console.

The present invention includes communications interface software which acts as a client to the end-user workstation for data retrieved from the network device.

The StatServer 15, application service poller 14, or both, requests data from the client device 10, the client application server 11, or both, respectively. The client device 10, client application server 11, or both returns the requested data to the StatServer 15 and/or application service poller 14 which in turn deliver it to the data warehouse server 17. The data is stored in its raw format until the client workstation 12 authenticates a user session and requests the stored data from the StatServer 15. Client workstation 12 uses a standard Internet web browser to request data from StatServer 15. StatServer 15 queries data warehouse server 17 data files for the requested client data and sends it to StatServer 15. StatServer 15 formats data for viewing then sends it to client workstation 12. Session terminates when client logs out or terminates use of Internet web browser.

Referring to FIG. 2, there are seven steps to the StatScope process in an embodiment of the invention. After the proper configuration has been determined on the client or application device the StatServer 15 and/or application service poller 14 requests data to be sent step 21. Client device 10, client application server 11, or both, sends data to StatServer 15 and/or application service poller 14 in step 22. StatServer 15 and/or application service poller 14 receives data and stores it on data warehouse server 17 in step 23. Data transfer session is terminated in step 24. From client workstation 12, client logs in and authenticates with StatServer 15 to initiate data retrieval in step 25. After successful authentication, requested data is sent to client workstation 12 in step 26. Client terminates authenticated session by logging out of StatScope web site or exiting client workstation 12 web browser in step 27.

Figure 3:
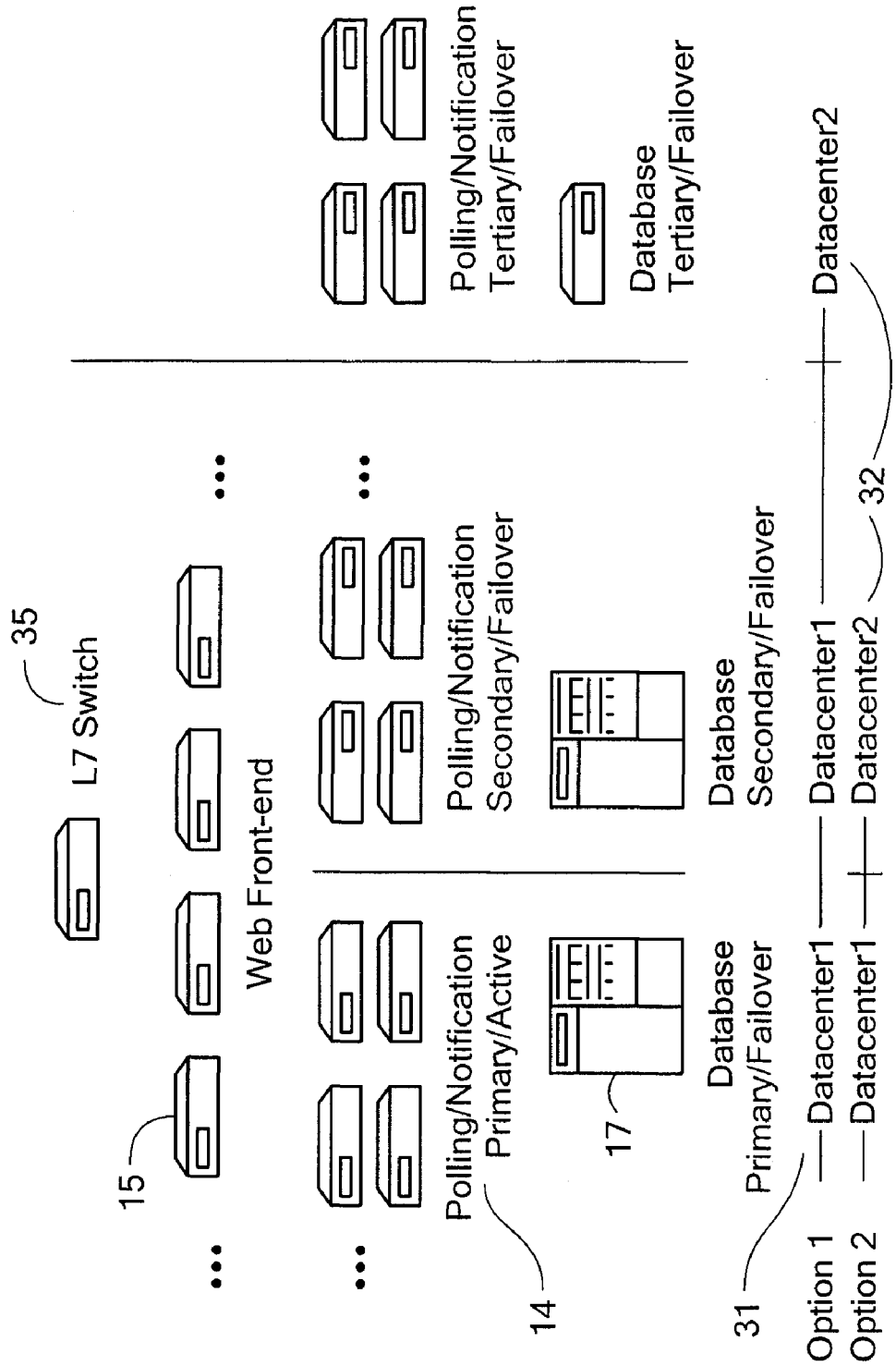
FIG. 3 is a relational diagram showing the back-end architecture of a global network monitoring system in an embodiment of the present invention.

Referring again to FIG. 1, and further to FIG. 3, which depicts the back-end StatScope architecture in an embodiment of the invention, StatScope uses a web-based interface to allow customers to access vital information about their leased line utilization statistics and other critical data about Internet services. Various embodiments for an interface are subsequently described.

There are three tiers in the back-end side of the StatScope service in embodiments of the invention. The primary tier is the StatServer 15, which serves as the web front-end, and is composed of a UNIX based operating system running on an Intel hardware platform, a graphics development library and CGI (Common Gateway Interface) software modules built off of the C and PHP programming languages. The operating system, graphics library and C/PHP programming software are commercially available.

The second tier is the application service poller 14. This tier is also a UNIX/Intel based hardware platform with C based software modules whose function are to monitor client service applications and device availability. In embodiments of the invention, as shown in FIG. 3, one or more datacenters 31 and 32 may be provided wherein a primary/active and secondary/failover application service poller 14 providing notification and polling functions may be provided in a first datacenter 31. A tertiary/failover application service poller 14 may be provided at the second datacenter 32.

The last tier is the data warehouse server 17 that includes the database. This device is a UNIX/Intel based hardware platform using a commercially available Standard Query Language (SQL) database package to store the client statistical data. The data collection modules, subsequently described, is shared amongst these three tiers to provide essential functions to an integrated management interface.

The StatServer 15 collects and stores client circuit utilization figures for viewing via a standard Internet web browser. All client profile information/configurations used by the StatServer 15 are stored in the SQL database on the data warehouse server 17. The StatServer 15 collects, but does not manipulate, the data it collects; it simply records the raw data to the database.

A Layer 7 (L7) switch 35 may also be provided in some embodiments to balance web traffic loads to StatServer 15.

Figure 4:
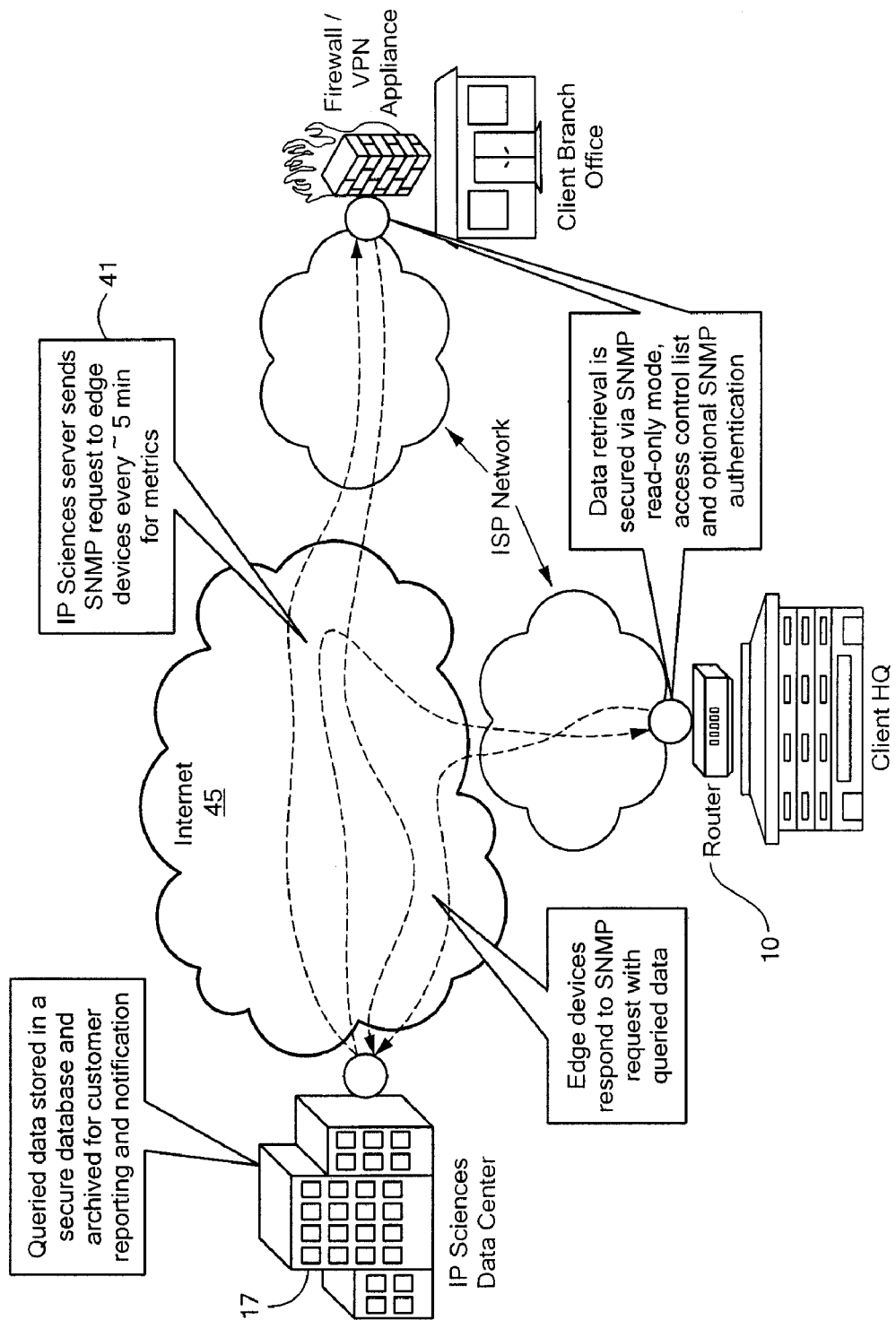
FIG. 4 is a high-level relational diagram showing a global network monitoring system in an embodiment of the present invention.

With continuing reference to FIGS. 1 and 3, and further reference to FIG. 4 which shows another high-level relational diagram of an architecture of the present invention, the utilization figures are gathered via SNMP from the client's routing device(s) or server/workstation(s). A CGI programming module sends out an SNMP poll request 41 to the client node(s) every five minutes and collects the data gathered on the device for the previous five minute period. That data is sent back to the StatServer 15 which in turn passes it to the data warehouse server 17 for permanent storage. All communications between the StatServer 15 and client devices 10 are done via Internet Protocol (IP) data packets sent over the Internet 45. The intervals at which the data is collected from the client nodes(s) can be altered as needed. The Simple Network Management Protocol (SNMP) is a standardized way of generating and retrieving messages about activity on enabled objects. The StatServer 15 is capable of retrieving information on any SNMP attribute from an object, but in the described embodiment the scope is limited to the attributes subsequently set forth.

The application service poller 14 collects data about availability of Internet accessible network nodes as well as services running on said nodes. The Poller uses C based software modules to generate standard Internet Control Message Protocol (ICMP) packets to determine whether an Internet Protocol based node is available via the client's Internet connection. This process is typically called "PINGing" as it is based on the standardized methodology of checking to see if an object is present by sending an anonymous message to the object to see if it responds. The client is responsible for registering with the StatServer 15 which nodes they want monitored. All data that the poller 14 collects is passed on to and stored in the data warehouse server 17 database(s) for future retrieval by the client. In addition to the "PING" test the application service poller 14 can also check the availability of particular service applications that most organizations use for Internet-based communications.

Collectively, The application service poller 14 is capable of checking for the availability of the following services: (1) HTTP: success means the client Web Server(s) is available and serving requests for connections; (2) SMTP: success means the client Mail Server(s) is available and processing e-mail messages; (3) FTP: success means the client File Transfer Server(s) is available and processing login requests; and (4) PING: success means the client device(s) are available and responding to the standard ICMP network response test.

HTTP, SMTP and FTP services are based on the application service poller 14 monitoring and testing on a periodic basis the standard TCP ports for these services. A set of standard programming commands (subsequently detailed) allows for a repeatable and reliable process of monitoring and reporting the success or failure of this test. Success means the services are available, failure means they are not.

Failure of any of these services results in an entry being made into an error log that the client can view via their personal profile on the StatServer 15. The error log will show via a time/date stamp and standardized message when a particular node has failed to respond to one of the above mentioned tests, any subsequent contiguous failures, and when said node successfully responds again. Notices will also be sent out when the client device fails one of the aforementioned tests via a standardized message to be sent to the client's SMTP server mail account or to a pager that is capable of receiving text messages.

The data warehouse server 17 acts as the repository for all data gathered from either the StatServer 15 or the application service poller 14. The relational database stores information in pre-defined tables for efficient retrieval and computation before presentation to the client via their personal profile they access via their web browser. The database is enabled on a separate physical server so as to provide efficiencies in the data gathering processes generated by both the StatServer 15 and the application service poller 14.

The client accesses all pertinent information via their personal profile that is setup on the StatServer 15. The client can use any standard Internet Web Browser to access a web interface at a predetermined website and then authenticate a login session and begin the information retrieval process. The client possesses a Username and Password for the authentication process. Once their personal profile is complete the client can view information about their circuit or node utilization in a graphical format via a dynamically generated GIF (Graphics Interchange Format), a type of bitmapped graphics file. The client can elect to view statistics on any of the node interfaces they have elected to have monitored by generating graphs from data that is displayed in 5 minute intervals. A variable time format allows the client to view data in one hour increments up to that day's most recent hour of collected data. The client can also elect to have graphs expanded to include daily, weekly, monthly, quarterly and yearly views. All of these options are configurable dynamically from the client profile page and require no configuration or re-programming changes of either the software modules or client devices.

While the StatScope engine is cosmetically similar to Multi Router Traffic Grapher (MRTG), a well known network management tool in the art, there is little similarity in the actual "behind the scenes" operation.

For comparison purposes, a brief explanation of how MRTG operates is provided. Every five minutes, MRTG is run, usually as a cron job (automated process) on a UNIX platform. MRTG is configured by manually editing a configuration file which dictates what SNMP variables should be gathered, how to scale the graphs, etc. At each of the five minute intervals, MRTG polls the devices via SNMP and records the returned data in a text file. It also creates/updates a daily, weekly, and monthly graph at that time. An important fact to note is that the MRTG data files do not grow in size over time. In order to achieve this, the MRTG engine compresses the data after 48 hours by lowering the granularity of the older data. Although weekly and monthly graphs are available, the data is not stored in five minute increments as is the daily graph data. The weekly data is stored and displayed as a 30 minute average, and the monthly data is stores and displayed as a two-hour average. Once this compression takes place, there is no way to retrieve the actual historical 5 minute data entries. StatScope stores data values in raw format, meaning that the actual data collected is the actual data presented via the graphical interface, no data compression takes place, unless specified by the customer via a configuration option on the user interface.

Accordingly, MRTG lacks the same granularity of the variable web interface of the present invention. StatScope allows for aggregation of multiple circuits in one view, can send graphic usage reports, predictive threshold alerts, outage alarms, and allows the client to view historical data. MRTG does not provide these services nor does it provide the ability to build them in. Finally, even though MRTG gathers data sets in 5 minute intervals, it stores and displays the weekly data as a 30 minute average, and the monthly data is stored and displayed as a two hour average. Once this compression takes place there is no way to retrieve the actual historical 5 minute data entries. StatScope shows the actual averages derived from the actual raw data samples gathered from each 5 minute interval.

Figure 5:
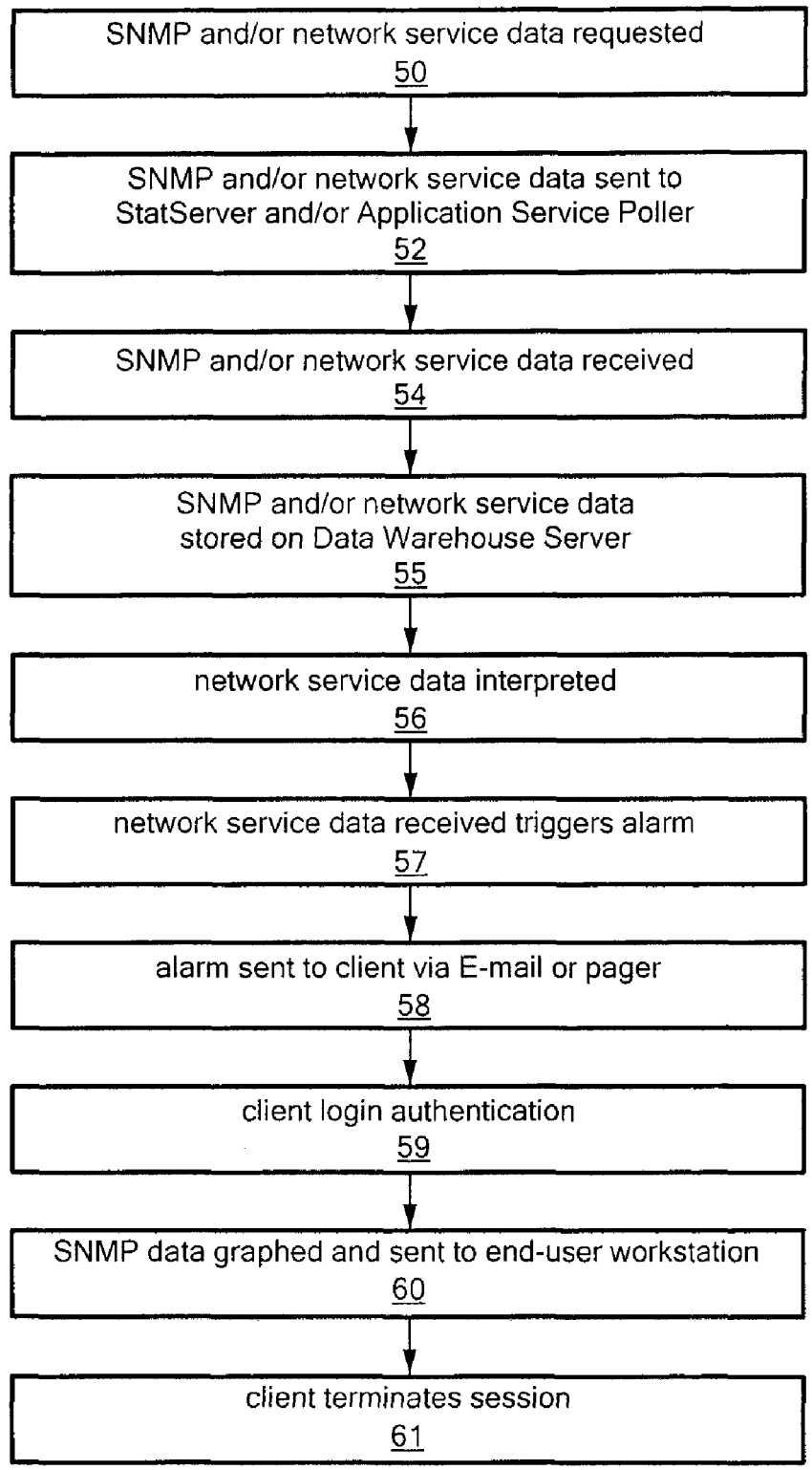
FIG. 5 is a flow diagram showing a data retrieval process over a global network monitoring system in an embodiment of the present invention.

The StatScope engine comprises several distinct components that inter-operate in embodiments of the invention to carry out the data retrieval process shown in FIG. 5. The core component is the actual database, which stores the customer preferences, customer device information, and all gathered data regarding customer circuit utilization. The other components communicate with the database via SQL (Structured Query Language) commands to both write and read information.

Routers running updated Cisco IOS versions are capable of polling a variety of statistics related to traffic performance, memory utilization, and other metrics, including connectivity through Ping latency and TTL data retrieval and SNMP statistics such as In/Out Packet Errors, Inbound/Outbound traffic and CPU Utilization.

In one embodiment, on every 5 minute interval the system polling engine is triggered at step 50. All 'active' monitors belonging to devices in the database are tested using specially designed suites which gather connectivity and SNMP based statistics. The statistics are then stored in the event log, and the thresholds are matched to determine if the monitor test failed for some reason (exceeded/fell below thresholds, couldn't query the value from the device, system outage, etc.).

In an exemplary embodiment, there are 3 escalation levels established by the user. Each indicates the delay in escalation by the user. For example: A user indicates that they would like a 5 minute delay on each level of escalation.

12:00 am—Error is triggered by a polled monitor
12:05 am—First level of escalation
12:10 am—Nothing happens because a 5 minute delay has been added to the normal 5 minute difference between polls
12:15 am—Second level of escalation
12:20 am—Nothing happens because a 5 minute delay has been added to the normal 5 minute difference between polls
12:25 am—Third level of escalation The user may disable notifications for a device from within the Device Manager subsequently described with reference to the user interfaces.

With continuing reference to FIG. 5, a polling component reads customer device information from the database at step 50, and uses that information to make SNMP queries at step 52 to the customer devices. The returned data values at step 54 are written to the customer database at step 55. The polling component does not manipulate the data in any fashion, it simply records the raw data to the database. The customer web interface also communicates with the database, in order to create a customized interface for each client, which reflects their preferences and monitored device specific information. The web interface is a series of CGI scripts written in PHP that reads customer information from the database, and uses the fourth component, the graphing engine, to create the customer graphs at step 60 in real time. The graphing engine is used to create, in real time, any customer graphs for a given date and time range. The graphing engine accepts the customer number, start and end date, and daily time range, and uses that data to poll that database and retrieve the corresponding raw data. It then manipulates that raw data and displays it as a GIF image, which is compatible with any common web browser. The GIF image does not use LZW compression, thus avoiding copyright infringement.

A testing component reads customer preferences from the database and performs application availability tests for non-SNMP devices. In an embodiment of the invention, the testing component can test for HTTP, SMTP, FTP, and simple "ping" response from a given device. This component updates the database via SQL with the current condition of each particular device at step 56. It will also trigger email alarms at steps 57 and 58 when customer-specified thresholds are reached, such as failing to respond to consecutive ping cycles. Following the alert, a customer logs into the web interface at step 59. After receiving a graph of SNMP data at step 60, the user may terminate the session at step 61.

The StatScope data collection modules are described in more detail as follows:

Customer SNMP Poller (CSP)

The CSP, residing on the StatServer 15, is a compiled C program script which is scheduled to run every five minutes, via a UNIX cron configuration. Upon being launched, the CSP makes a SQL (Structured Query Language) query to a database that resides on the Data Warehouse Server to determine the list of active customers. For each customer, the CSP uses a multithreaded process, meaning that each customer device is polled in parallel, not serially. Each forked process queries the database again to determine that customer's IP address and Object Identification (OID) information. OID is defined by the SNMP standards. CSP then uses the C module built into the UCD SNMP package (such as made available on the Internet by the University of California-Davis) to make an SNMP query to each of the customer's devices with the corresponding IP address and OID. All of the returned raw data is then written to the database in the event_log data table, along with a timestamp, which denotes the current time. If a customer device does not return any valid data, a value of −1 is written to the database with the same timestamp. In other embodiments, rather than sending out many individual SNMP get requests (one for each SNMP-suite metric), the system includes all OIDs pertaining to one device in each SNMP get request, i.e., SNMP get bulk requests.

The Graphing Engine (GE)

The GE, also residing on StatServer, is triggered by the PHP CGI scripts which create the customer interface. The interface scripts pass the following values to the GE: customer number, start date, stop date, daily start hour, daily stop hour, and what customer elements to graph. The GE pulls only the pertinent data from the database using SQL commands. The GE uses the GD graphics library provided by Lincoln Stein of the Cold Spring Laboratory in Cold Spring Harbor, N.Y., to create the GIF images from the data, although it will be appreciated those skilled in the art that other GD libraries may be used.

If a customer has selected to have their data "smoothed" on the web interface, each datapoint is normalized to a value equal to the average of the 2 data points preceding and the two data points following the given datapoint. This has the effect of eliminating or greatly reducing the appearance of individual single data point spikes within the graph. Each customer element (e.g. data into an interface, data out of an interface, CPU utilization) is plotted on a time versus value scale, and charted on a single GIF image. The GIF image is written to the server as a temporary file, and the name of that file is returned to the hard drive, for inclusion into the user interface.

Customer Application Tester (CAT)

After writing data to the database, the CSP triggers the Customer Application Tester (CAT), residing on the application service poller 14, for each customer. Once again, because the CAT is triggered by the polling thread, each customer's device is tested in parallel. The CAT queries the database on the data warehouse/server 17 via SQL for each customer, and determines which tests need to be done. The customer information table contains a field labeled "type" for each monitored entity. For entities that need to be tested, the available valid entries are HTTP, SMTP, FTP and ping. The "type" field determines which test is to be run for that particular entity.

For HTTP testing, the CAT uses a separate script which opens a network socket to port 80 on the target server, and passes the HTTP HEAD command to that server, requesting information about the file or resource provided by the customer. The HTTP tester returns a pass/fail notification to the CAT.

For FTP testing, the CAT used a separate script which opens a network socket to port 25 on the target server, and passes the FTP NOOP command to that server, which returns data that can be used to determine the availability of the server. The NOOP command does not require a username or password login, and supported by any standards-compliant FTP server. The FTP tester returns a pass/fail notification to the CAT.

For SMTP testing, the CAT uses a separate script which opens a network socket to port 23 on the target server, and passes the SMTP HELO command to that server, which returns data that can be used to determine the availability of the server. The SMTP tester returns a pass/fail notification to the CAT.

For ping testing, the CAT uses a freeware unix ping utility called fping developed by Roland Schemers of Stanford University. This third party utility was specifically created to be used in a scripted fashion, and its output is easily machine readable. The CAT simply calls the fping script and accepts the output. The results of all the tests described above are stored in the customer data profiles on the Data Warehouse Server so historical information about the success/failure of each test interval can be retrieved by the customer via the GUI. A failure of any of the above tests can generate an automated E-mail message or text-pager notification with specifics about which service failed and for how long. Following a failure in one of the above tests a successful test will generate a corresponding E-mail or text-pager notification that the service is available and responding again.

With reference again to FIG. 4, in an exemplary embodiment, data retrieval occurs through a customer using the StatScope process as provided by an Application Service Provider (ASP). A customer submits information about their Internet gateway terminating device. This information includes the kind of router or bridge running TCP/IP and having at least one serial, fiber optic, or Local Area Network style interface for connectivity to the telecommunications carrier that provides their Internet circuit(s). The information also includes the following specific technical details submitted via an electronic template on the ASP's website manually configured by an ASP engineer. Once the necessary SNMP and IP address information is retrieved and added to the customer profile created by an ASP engineer, service can begin. This technical information/configuration includes:

(1) IP address of the interface that connects directly to the customer's Internet Service Provider. There could be more than one of these interfaces on the terminating device and the customer could elect to provide information about as many of them as they choose, but information about one of the active interfaces is all that is necessary to get the StatScope service operational. These addresses must be routable Internet addresses, or a private address available through a secure IPSec tunnel. IP addresses of individual service machines, like Web, FTP or Mail servers should also be supplied if the customer elects to have application availability monitoring services enabled as well; and (2) The exact sequence of alphanumeric characters that makes up the Simple Network Management Protocol community string. This string is a configuration setting that allows external devices or services, like StatScope for example, to monitor the activity of pre-defined subsets of objects on the device. The information gleaned from this setting can provide statistical data about things like device central processor utilization, specific interface utilization, device error information, etc. For the purposes of StatScope it is irrelevant what type of device is being monitored—typically it would be something like an Internet routing device, for example, from Cisco, Nortel or Lucent or it could even be a personal computer connected via Ethernet to a Digital Subscriber Line in a small office or home. The only requirements are that it be capable of running SNMP, that a "read-only" community string be present in the device configuration, and that the device(s) is reachable from the Internet. The "read-only" aspect of the community string configuration implies that only the capability to read information from SNMP objects is allowed, not the ability to write new SNMP configurations or objects to the device being monitored.

The foregoing technical information may be supplied/configured by the customer's service provider, the customer or an ASP engineer, as necessary.

Once the configuration requirements have been confirmed, a customer account profile is created. This profile includes a customizable HTML based web interface that the customer will log into with a unique username and password. Upon logging into the web site via a customer logon link on the StatScope main web page, the customer is presented with a view of their interfaces that are being monitored, listed alphabetically by the pseudo-name that the customer elects to give each interface such that it is more understandable as to what the interface actually represents. These pseudo-names (and all other relevant service configuration information) are supplied by the customer via the Web based configuration template that is submitted electronically by the customer via the ASP Web site. Graphs can be viewed one at a time or in aggregate fashion as the customer can elect to view as many or as few interfaces as they want via the standard point and click functionality built into the web interface that allows them to click on and mark as active the interfaces that they want to see information for at that time.

In further embodiments, the customer can view activity logs for service devices (Web, FTP, Mail, Ping) that are being monitored via a scrolling window below the graph. This window will display messages that indicate when one of the above mentioned services is not available and then display a message when it again becomes available.

Once the customer elects which monitoring options will be enabled, service is turned on and monitoring begins.

As a further illustration, an exemplary embodiment of a ASP-based system of the present invention is described with respect to a fictitious client, ABC Corporation, desiring data network monitoring and management.

ABC Corporation's configuration parameters ABC for StatScope service are as follows:

1. At least one network device, typically, a router or bridge that connects the ABC Corp. network to the Internet. Said device has at least one routable Internet Protocol address and a "read-only" SNMP community string configured and made available to IP Sciences.

2. Optionally, one or more application servers such as the ABC Corp. company web, mail, or FTP server and IP address of said server(s).

3. An E-mail or text-pager address where notification messages can be sent to an ABC Corp. designated technical contact.

After service has been running long enough to collect usable data the ABC Corp. personnel can log into their personal Graphical User Interface (GUI) at the ASP's website. Access is facilitated via a simple Userid and Password. ABC Corp. personnel are provided their company interface page and all configuration information on the left hand side pane, the data graphs in the center of the page and then the service availability notification window at the bottom of the page.

After enough SNMP information has been collected, an ABC Corp. employee with access to the their account profile could login and view in a graphical format statistical information about the utilization of their Internet circuit(s) and check log information about the availability of application services such as mail, web or ftp service. Utilization information can be checked in hourly, daily, weekly or longer formats.

By pointing-and-clicking on the necessary drop-down menus, an ABC Corp. employee may choose to check circuit utilization figures from the previous day for the hours of 9 AM-5 PM to see what type of activity took place during the course of the workday and then choose to view the same figures for the hours of 9 AM-5 PM for all days during the previous week in order to make a day-by-day comparison. Alternatively, ABC Corp. could choose to view all the days utilization figures in one aggregate view by selecting an entire weeks worth of datapoints at once in lieu of viewing them by each individual day. Aside from the standard weekly/monthly text based E-mail reports that are a standard part of the service, ABC Corp. could download the graph for inclusion in a weekly executive summary report as needed so as to be able to easily display usage figures for corporate Internet access.

During the course of the initial data collection period assume that the ABC Corp. mail server was down for 30 minutes. The designated point-of-contact(s) would have received either an electronic or text-pager based notification message with a time/date stamp and a standardized message stating that the server is not responding. Assuming that after 45 minutes of mail server outage the server starts responding again, another electronic message would have been sent stating the device was up and operating again.

An ABC Corp. employee can login into their profile and check the summary of these messages in the service notification window and then retrieve the data, for example, for inclusion in a report to be distributed to the personnel responsible for administering the mail server. After all relevant information has been retrieved the ABC Corp. employee would logout and terminate the session.

In embodiments of the invention, SNMP technology is also used as described in the foregoing discussion of StatScope, to monitor performance metrics for Virtual Private Network (VPN) devices and tunnels in a multithreaded polling engine, referred to throughout this specification as VPNScope. It is understood by those skilled in the art that VPN is a private network that uses a public network (usually the Internet) to connect remote sites or users together. Instead of using a dedicated, real-world connection such as a leased line, a VPN uses "virtual" secure connections routed through the Internet from a company's private network to a remote site or authorized individual.

Figure 19:
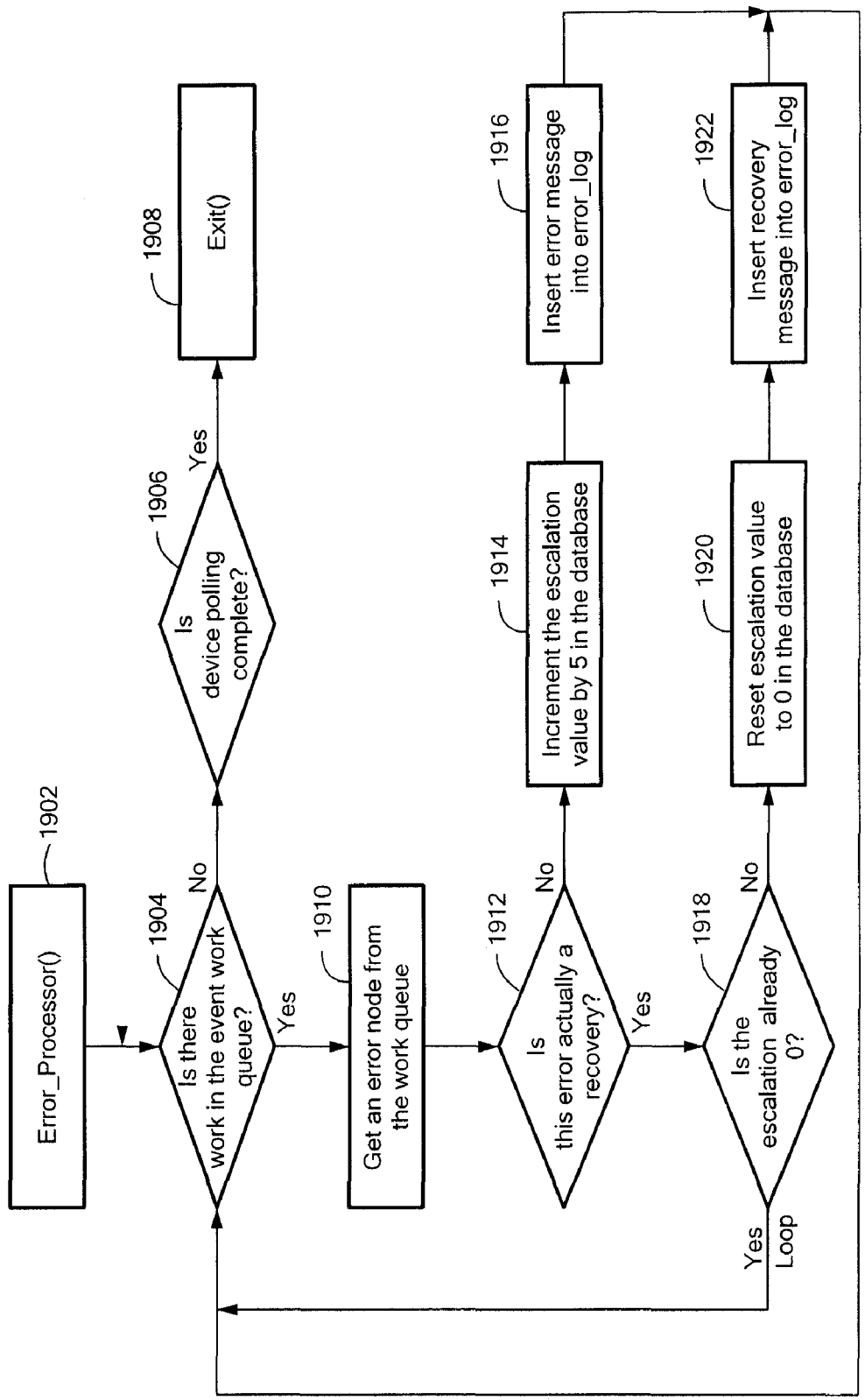
FIG. 19 is a flow diagram of an Error_processor thread in an embodiment of the present invention.
Figure 20:
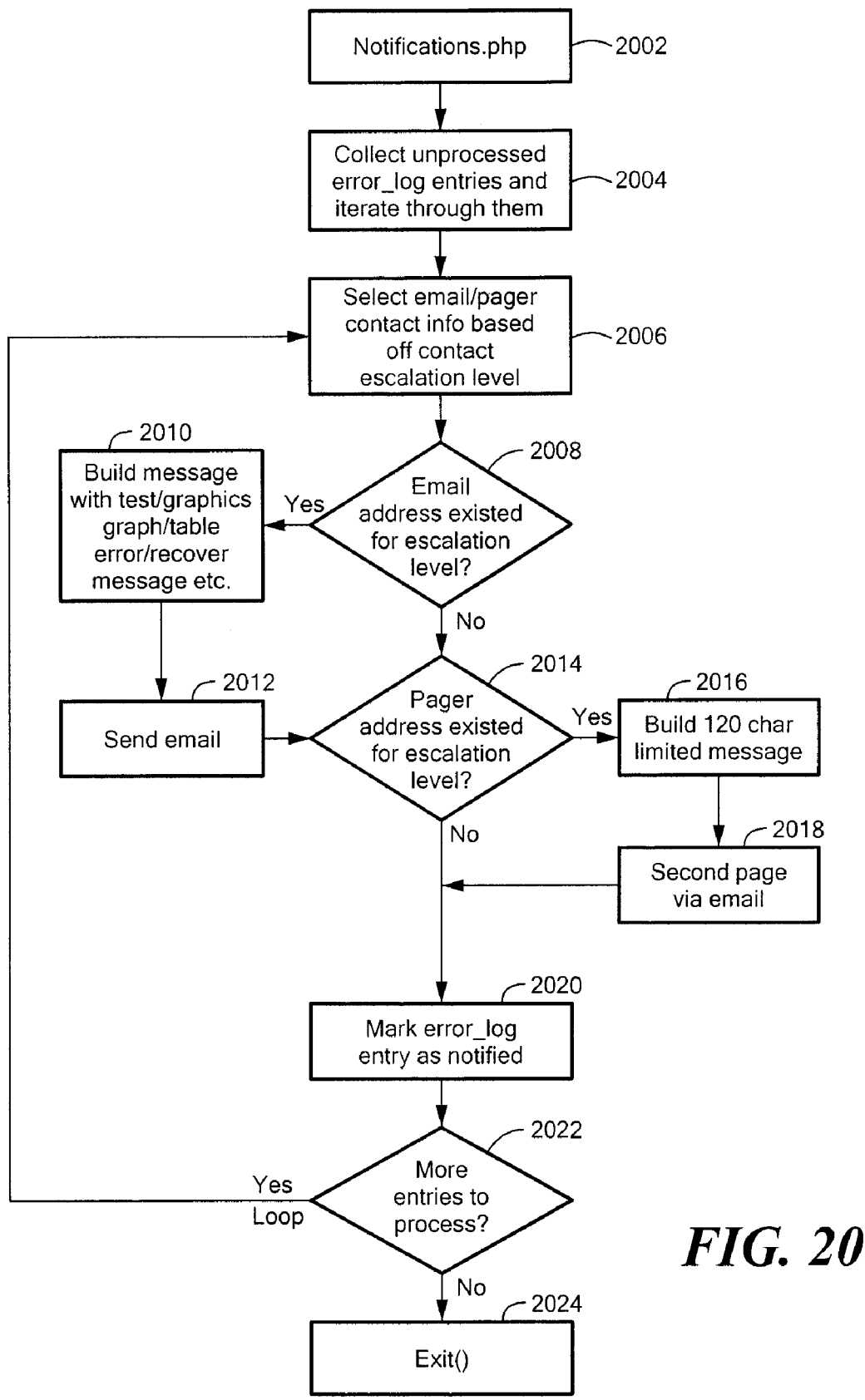
FIG. 20 is a flow diagram of a Notifications process in an embodiment of the present invention.
Figure 21:
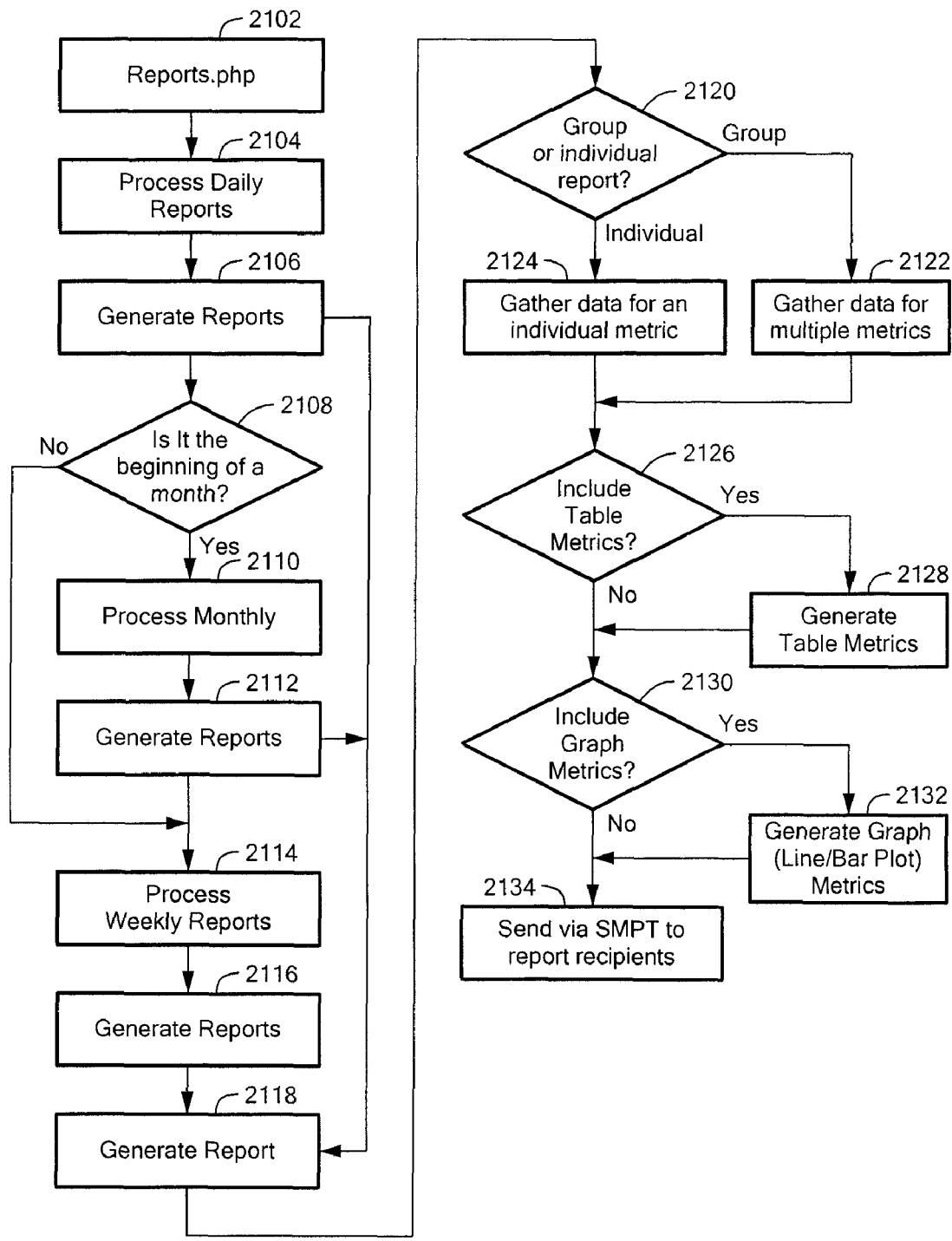
FIG. 21 is a flow diagram of a Reports process in an embodiment of the present invention.

Referring to FIGS. 14-21, a multithreaded polling engine including VPN monitoring (as well as StatScope), includes Main( ) flow (FIG. 14) that calls Device_poll( ) (FIGS. 15A.1-15B.2), Event_inserter( ) (FIG. 17), Counter_updater( ) (FIG. 18), Error_processor( ) (FIG. 19), Notifications.php (FIG. 20) and Reports.php (FIG. 21).

Figure 14:
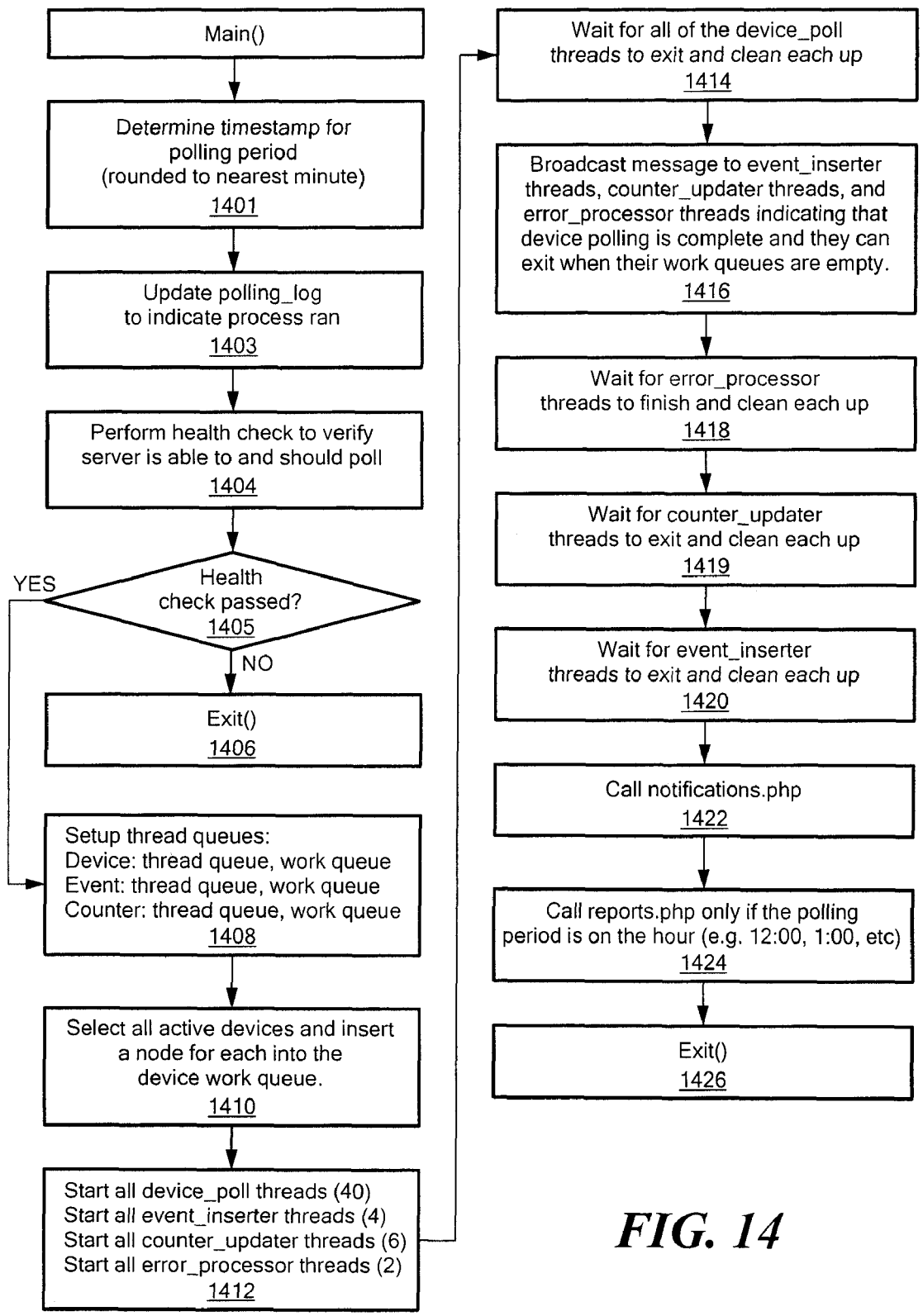
FIG. 14 is a flow diagram of a Main polling process in an embodiment of the present invention.

Referring to FIG. 14, Main( ) polling process is also referred to in this description as ips_engine. Main ( ) flow is launched by Cron, a Unix/Linux event scheduler for executing commands or processes at desired times, every five (5) minutes on exact five (5) minute intervals. The polling cron job will run every 5 minutes on both the primary and disaster recovery site production servers (FIG. 3).

Following initiation, the ips_engine determines at step 1401 the timestamp for the polling period rounded to the nearest minute. When the polling cron job process is started, an entry will be added to the polling_log (local database) indicating that the process for polling was correctly started at step 1403. This update occurs before any additional checking, as all it is meant to log is that the process was started by the cron job. Each production server is assigned a server_type tag in the statscope.ini file (configuration) identifying it as either the 'primary' or 'secondary' server for failover purposes.

At step 1404 a health check will be performed during each polling session and be used to determine whether that individual server should poll or not. This health check is partially dependant upon the times on the two servers being very closely in sync (with a <10 second discrepancy). This requirement is to be handled by ops using time server synchronization.

Additional checking will be done before event_log inserts to attempt to further guarantee that duplicate data is not inserted. These checks should never truly be necessary due to the health check, but are implemented simply as one extra layer of checking.

At step 1405, the Primary Server carries out the health check by: (1) checking that my database connection is up (if it is not then exit) and (2) checking that my internet connection is up by checking 10 predetermined internet sites via HTTP-GET and if any of those checks succeed then "up", otherwise "down". If determined "down" in the health check step 1405 then exit at step 1406, otherwise continue with polling as shown in step 1408.

The Secondary Server during the health check determines if the primary server is up by checking if it can connect to the primary servers database, If it can, the secondary server waits 10 seconds and checks that there is an entry in the primary servers database polling_log for this period from the primary server. If the secondary servers finds an entry, it assumes the primary to be up an exits. If the secondary server does not find an entry, then it assumes the primary to be down, and continues checking. If it could not connect to the primary servers database then it assumes the primary is down, and continues checking. If still checking, the secondary server then checks that its database connection is up and exits if it is not. If still checking, the secondary also check that its internet connection is up by checking 10 predetermined internet sites via HTTP-GET and if any of those checks succeed then the secondary is up, otherwise it is down. It the secondary server determines it is down in the above step then it exits, otherwise it continues with polling.

Once the health check is passed, at step 1405, the ips_engine sets up thread queues at step 1408 for the device (FIGS. 15A.1-15B.2), event (FIG. 17), counter (FIG. 18) and error (FIG. 19) subflows. At step 1410 all active devices are selected and a node for each device inserted into the device work queue.

At step 1412, the device (FIGS. 15A.1-15B.2), event (FIG. 17), counter (FIG. 18) and error (FIG. 19) threads are started.

Referring to 15A.1-15B.2, the Device_poll flow is initiated at step 1502. At step 1504, the Device_poll thread determines whether there is a device in the work queue. If not, the Device_poll process exits. If there is a device in the work queue, the device is retrieved from the queue at step 1508.

At step 1510, the thread determines if the device has tunnels, i.e., whether the device contains encrypted data intended for use only within a Virtual Private Network (VPN). If not, then the device is polled for its Simple Network Management Protocol (SNMP) based metrics at step 1536 (discussed further below). If the device has tunnels, the thread determines what type of tunnel it uses, based on the make/model of the device (e.g. Cisco, NetScreen, Altiga), at step 1512. With reference to Appendix 4, an embodiment of the actual code for updating tunnel Ids is provided. With reference to Appendix 5, and as described in more detail below, an embodiment of the actual code for walking the tunnel determination threads via SNMP GETNEXT commands (by manufacturer) is also provided.

If the device uses Cisco Systems IPsec, the Device-poll thread performs, at step 1514, SNMP GETNEXT commands on each cikeTunRemoteAddr Object ID (OID) to search for the first entry that matches the remote tunnel address. When a match is found, the OID is parsed at step 1516 for its index value and this index value is saved as the Session One ID. At step 1518, the thread then performs SNMP GETNEXT commands on each cipSecTunRemoteAddr OID to search for all entries matching the remote tunnel address. For each entry, the thread checks at step 1520 to see if an entry in the phase 2 database table already exists. If an entry does already exist, the thread loops and checks the next entry at step 1520. If an entry does not exist on the phase 2 database table, an entry is added to that table for the ID at step 1522. At step 1524, the thread deletes any phase 2 database entries that are no longer valid. The thread then updates the phase 1 tunnel ID in the database at step 1534.

Referring back to step 1512, if the device uses Altiga Networks IPSec, the Device-poll thread performs, at step 1526, SNMP GETNEXT commands on each alActiveSessionIpAddress OID to search for the first entry that matches the remote tunnel address. When a match is found, the OID is parsed at step 1528 for its index value and this index value is saved as the Session One ID. The thread then updates the phase 1 tunnel ID in the database at step 1534.

Referring once again to step 1512, if the device uses NetScreen IPSec, the Device-poll thread performs, at step 1530, SNMP GETNEXT commands on each nsVpnMonSAID OID to search for the first entry that matches the user-provided Security Association ID. When a match is found, the OID is parsed at step 1532 for its index value and this index value is saved as the Session One ID. The thread then updates the phase 1 tunnel ID in the database at step 1534.

Proceeding from step 1534, or from step 1510 if the device does not have tunnels, the Device_poll thread polls the device's SNMP-based metrics at step 1536. At step 1538, the thread selects all SNMP-based metric OIDs for the device from the database. The thread then adds system.sysUpTime.0 to the OID list for the device at step 1540. SNMP GET commands are then executed at step 1542 on OIDs in groups of 25 until all OIDs have been retrieved. At step 1544, the thread then matches each SNMP response variable with a requested OID and stores the returned value.

For each OID that was retrieved, step 1546 checks to determine if it is a "counter" OID, an OID that increments by one for every time an event occurs, or a "gauge" OID, an OID that reports a specific variable. If the OID is a gauge OID, the thread proceeds immediately to step 1562.

If, however, the OID is a counter OID, step 1548 determines whether the device's uptime is greater than five minutes. If not, step 1550 resets the counter since the last period, the thread uses the new counter value without computing a delta, and the thread proceeds to step 1562. If the device's uptime is greater than five minutes, the thread determines at step 1552 whether there is an old counter value available in the system. If not, step 1554 stores the newly polled value as the counter, but stores zero for the gauge because there is not yet enough information available to compute a gauge; the thread then proceeds to step 1562. If an old counter value is available in the system, step 1556 determines whether the new counter is greater than the counter from the last 5 minute interval. If not, step 1558 computes the gauge value taking into account that the counter necessarily has overflowed and wrapped back to zero during the last 5 minutes; the thread then proceeds to step 1562. If the new counter is greater than the counter from the last 5 minute interval, the gauge is set at step 1560 to be equal to new_counter minus old_counter; the thread then proceeds to step 1562.

Turning to step 1562, at this step, the Device_poll thread determines whether the metric is a phase 2 tunnel metric. If so, the thread sums all gauges for the same phase 2 metric to get the final gauge value at step 1564. At step 1566, the thread then inserts an event node into the event work queue for the monitor, timestamp, gauge, and server values. A counter work node is then inserted into the counter queue for the monitor and counter values at step 1568. Next, the thread calls the Process_rules thread (detailed below) for the monitor and its gauge value at step 1570.

At step 1572, the thread then determines if there are any more metrics to process. If so, the thread loops back to step 1546. If not, the thread polls the availability metrics at step 1574.

From step 1574, the thread proceeds to step 1576, where it evaluates whether the availability is to be monitored via SNMP or not. If not, the thread attempts an Internet Control Message Protocol (ICMP) Ping to determine the device's availability at step 1580. If the availability is to be monitored via SNMP, the thread determines, at step 1578, if it was able to poll the device's Uptime in SNMP polling; if successful, then that means the device is available. From steps 1578 or 1580, the thread continues to step 1582 where it inserts an event node into the event work queue for the monitor, timestamp, availability, and server values. Next, the thread calls the Process_rules thread (detailed below) for the monitor and its availability value at step 1584.

Next, the Device_poll thread polls the connectivity metrics at step 1586. At step 1588, the thread attempts an ICMP Ping and measures the response time. The thread then inserts an event node into the event work queue for the monitor, timestamp, availability, and server values at step 1590. Next, the thread calls the Process_rules thread (detailed below) for the monitor and its connectivity value at step 1592.

Finally, the Device_poll thread loops back to step 1504 for polling the next device, if any, in the work queue.

Figure 16:
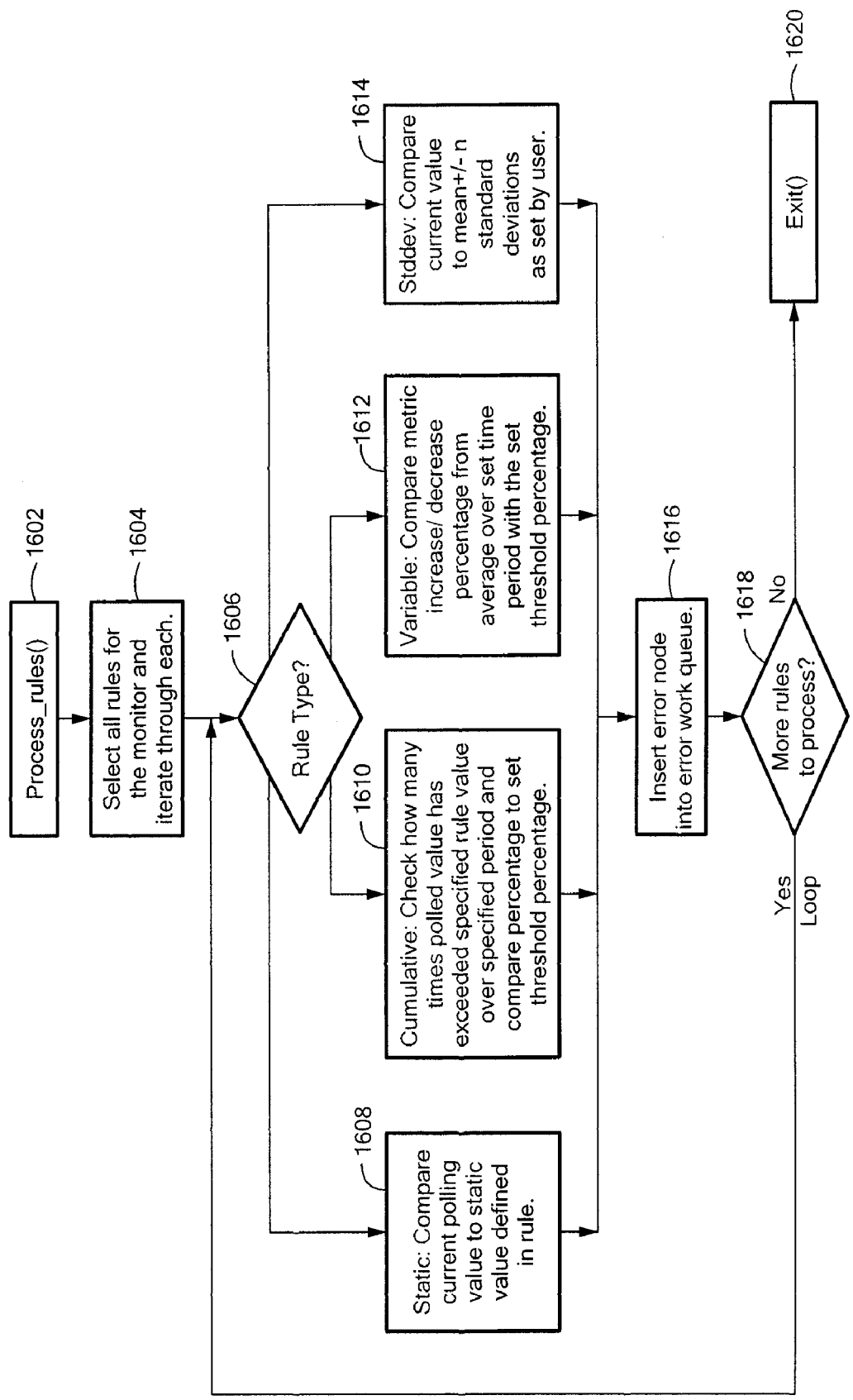
FIG. 16 is a flow diagram of a Process_rules thread in an embodiment of the present invention.

Turning now to FIG. 16, the Process_rules thread, called by the Device_poll thread at steps 1570, 1584, and 1592 (FIG. 15B), is described. The Process_rules thread processes all of the rules for a specific monitor, tests the result for each monitor to see whether any thresholds have been exceeded, and inserts an entry into the error work queue for each exceeded threshold. The Process_rules thread begins at step 1604, where it selects all the rules for the particular monitor and iterates through each rule. Appendix 3 provides an embodiment of the actual code for carrying out rule processing.

At step 1606, the thread determines which type of rule is selected. If it is a static rule, the thread compares the current polling value to the static value defined in the rule at step 1608. If it is a cumulative rule, the thread checks how many times the polled value has exceeded a specified rule value over a specified time period and compares this percentage to a set threshold percentage at step 1610. If it is a variable rule, the thread compares the metric increase or decrease percentage from the average over a set time period with a set threshold percentage at step 1612. Lastly, if it is a standard deviation rule, the thread compares the current value to standard deviations (mean+/−n) as set by the user at step 1614. If any of the thresholds from steps, 1608, 1610, 1612, or 1614 are exceeded, the thread inserts an error node into the error work queue at step 1616.

The Process_rules thread then evaluates whether there are more rules to process at step 1618. If so, the thread loops back to step 1606. If not, the thread exits.

Figure 17:
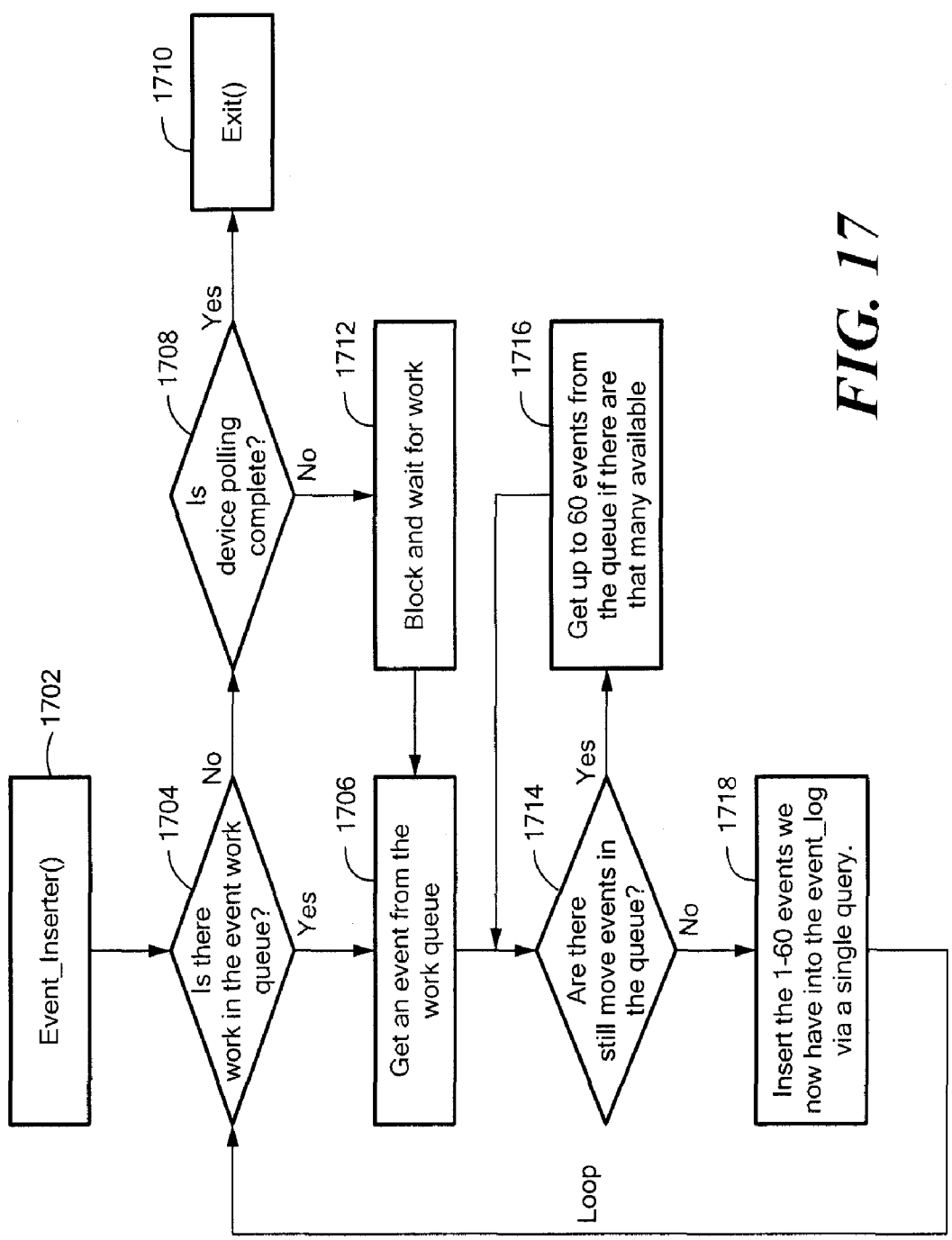
FIG. 17 is a flow diagram of an Event_inserter thread in an embodiment of the present invention.

Referring to FIG. 17, the Event_inserter thread is initiated at step 1702. The Event_inserter flow processes poll result entries in event work queue and inserts the entries into the event_log in the database.

At step 1704, the Event_inserter thread determines if there is work in event work queue. If yes, an event is retrieved from the work queue at step 1706. If no, the thread determines at step 1708 if device polling (FIGS. 15A.1-15B.2) is complete. If device polling is not complete, the event_inserter( ) blocks and waits for work at step 1712. If device polling is complete the Event_inserter process exits.

With reference to step 1706, when the thread does not exit, an event is obtained from the work queue. At step 1714, the thread determines if there are still more events in queue. If yes, up to 60 events are obtained from the queue at step 1716. If no, up to 60 events are inserted into event_log at step 1718 in a single query, and the process loops to step 1704.

In certain embodiments of the invention, when it comes time to insert into the event_log (as either a primary or secondary server), first check that a row with the same monitor_id, monitor_server_id, and timestamp does not already exist. If replication is up to date this will ensure that even if polling runs on both sides for a polling period, data only gets inserted once. Any slight delay in replication would break this guarantee. Notifications and reports would still potentially run twice.

Figure 18:
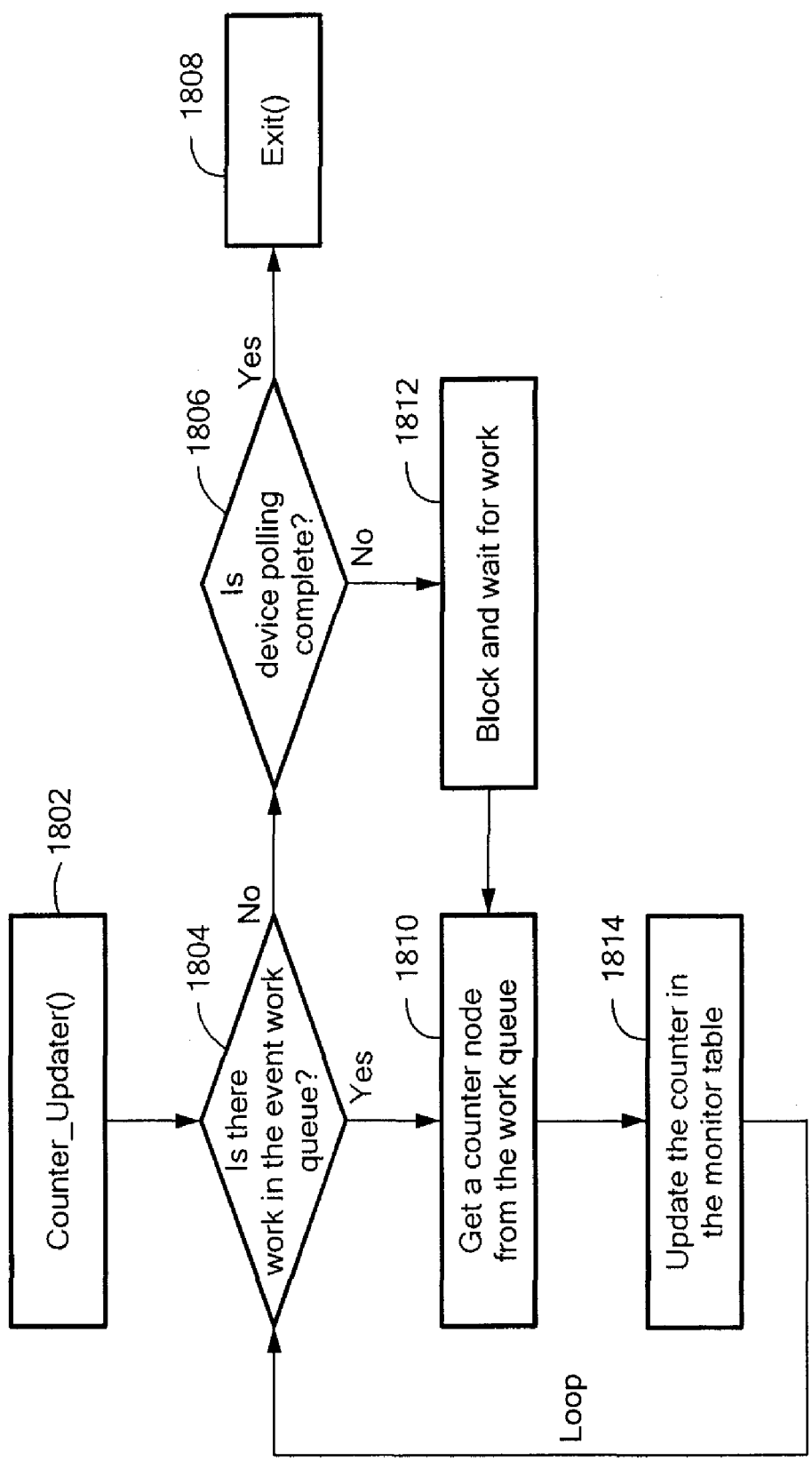
FIG. 18 is a flow diagram of a Counter_updater sub-flow in an embodiment of the present invention.

Referring to FIG. 18, the counter_updater flow processes poll entries in the counter work queue and updates the counter value in the monitor table in the database. This function is provided because counter value needs to be saved in the database for comparison with the next polled counter value so a gauge value can be computed.

After the counter updater( ) subflow is initiated at step 1802, the first determination is whether there is work in the counter work queue at step 1804. If yes, a counter node is retrieved from the work queue at step 1810. If no, a query is made at step 1806 to determine if device polling (FIGS. 15A.1-15B.2) is complete. If polling is complete, the thread exits at step 1808. If polling is not complete, at step 1812 the thread is blocked and waits for work and proceeds to step 1810.

From step 1810, the counter_updater flow updates the counter in the monitor table at step 1814. The process then loops back to step 1804.

In one embodiment of the invention, an additional 64 bit column is added to the event log for the storage of counter values. There are two types of values being stored in the event log: (1) Counter that is an 'odometer' like value which increases/resets overtime and (2) Gauge that is a 'speedometer' like value which measures the live performance. System bottle necks can occur with the handling of counters (i.e., inbound traffic, outbound traffic, error counts). In this embodiment including an additional 64 bit column, during every metrics query, the difference between sequential counter values in the event log tables are calculated and used to produce the gauged throughput values. During a valid poll, the difference between the last 'COUNTER' and the recently polled SNMP counter will be the 'RESULT', the polled SNMP counter will be the current 'COUNTER'.

Referring to FIG. 19, the Error_processor flow processes rule evaluation result entries in the error work queue and determines for each entry if an error_log entry needs to be made in the database. Entries are made in the error_log when (1) a threshold has been exceeded and (2) an exceeded threshold has recovered. This flow also updates the escalation value in the database. Appendix 2 sets forth an embodiment of the actual code that may be used to perform error processing.

At step 1902, the error processor thread is initiated. Next, the thread determines if there is work in the error work queue at step 1904. If no work, at step 1906, the thread determines if the device polling (FIGS. 15A.1-15B.2) is complete. Once the polling is complete the thread exits at step 1908.

Following step 1904, if there is work in the error work queue, at step 1910 an error node is obtained from the work queue. At step 1912, the flow queries whether the error is actually a recovery. If the error is a recovery, at step 1918 it is determined whether the escalation is already 0. If the error is not a recovery, the escalation value is incremented by 5 in the database at step 1914, and an error is inserted into the error_log at step 1916.

At step 1918, where it is determined if the escalation is already at 0, the flow proceeds to step 1920 if the escalation is not at 0. At step 1920 the escalation is reset 0 and a recovery message is inserted into the error log at step 1922. If the escalation is already at 0, the process loops back to step 1904. This also occurs after steps 1916 and 1922.

Referring again to FIG. 14 of the Main( ) flow process, at step 1414 device polling proceeds through exit and clean up before a broadcast message is sent to event_inserter, counter_updater and error_processor threads at step 1416 to notify of completion of device polling so they can exit when their work queues are empty.

At steps 1418, 1419 and 1420, the error_processor, counter_updater and event_inserter threads are awaited for exit and clean up. After the clean up and exit of these subflows, notifications.php is called at step 1422.

Referring to FIG. 20, the Notification Engine (notifications.php) is described. (While the following illustrates the particular processing steps performed by the Notification Engine, a more detailed description may be found at Appendix 1, which sets forth an embodiment of the actual code that may be used to perform the notification process.)

At step 2004, the Notifications thread collects all of the unprocessed error_log entries and iterates through each of entry. The thread first selects the email or pager contact information which is based off of the current escalation level at step 2006. At step 2008, the thread determines whether an email address exists for the escalation level. If so, the thread builds a message that includes such information as text and/or graphics, graphs and/or tables, or error and/or recover messages at step 2010. This message is then sent at step 2012.

After sending an email message at step 2012, or after determining that no email address existed for the escalation level at step 2008, the thread determines whether a pager address exists for the escalation level at step 2014. If so, the thread builds a 120 character limited message at step 2016 and sends the message as a page via email at step 2018.

After sending a page at step 2018, or after determining that no page address existed for the escalation level at step 2014, the thread marks the error_log entry as notified at step 2020. At step 2022, the thread evaluates whether there are more entries to process. If so, the thread loops back to step 2006. If not, the thread exits.

Referring again to FIG. 14 of the Main( ) flow, after notifications.php has exited, reports.php is called at step 1424 if the polling period is on the hour.

Referring now to FIG. 21, the Reports Engine (reports.php) is described. The Reports Engine processes the daily reports at step 2104, then proceeds to step 2106 to generate the daily report (detailed below). At step 2108, the thread determines whether it is the beginning of the month. If it is the beginning of the month, the thread processes the monthly report at step 2110, generates the monthly report at step 2112 (detailed below), then processes the weekly reports at step 2114 and generates the weekly report at step 2116 (detailed below). If however, it is not the beginning of the month, the thread proceeds directly to step 2114.

At step 2118, the Reports Engine generates the daily, weekly, or monthly report. The thread determines whether the report is a group or individual report at step 2120. If it is a group report, the thread gathers data for multiple metrics at step 2122. Otherwise, if it is an individual report, the thread gathers data for an individual metric at step 2124.

At step 2126, the thread determines whether table metrics are to be included in the report. If so, the table metrics are generated at step 2128. If not, the thread proceeds directly to step 2130.

At step 2130, the thread evaluates whether graph metrics are to be included in the report. If so, the graph metrics (i.e., a line or bar plot) is generated at step 2132. If not, the thread proceeds directly to step 2134, where the thread sends the report to its recipients via SMTP and then exits.

Referring again to FIG. 14, following completion of the Reports process, the Main( ) flow exits at step 1426.

Figure 6:
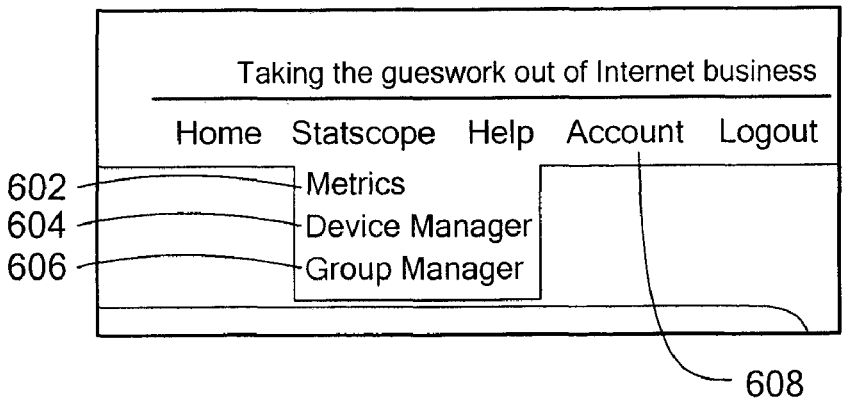
FIG. 6 is a graphical user interface (GUI) showing selectable menus in an embodiment of the present invention.

Referring to FIG. 6, the StatScope menu includes "Metrics" 602, "Device Manager" 604 and "Group Manager" 606 options in a first embodiment of the invention.

Figure 7:
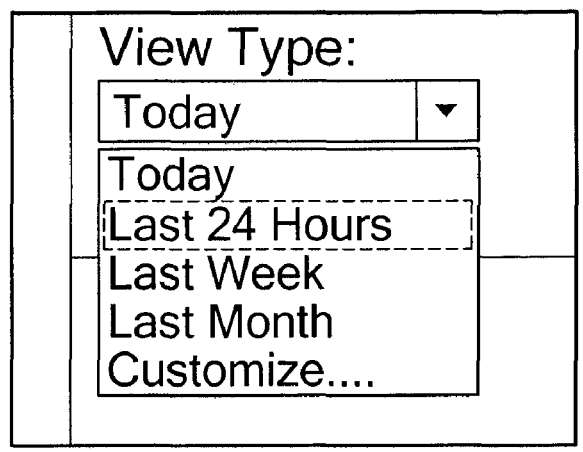
FIG. 7 is a GUI showing a selectable "View Type" menu as a sub-menu for Metrics reporting in an embodiment of the present invention.
Figure 8:
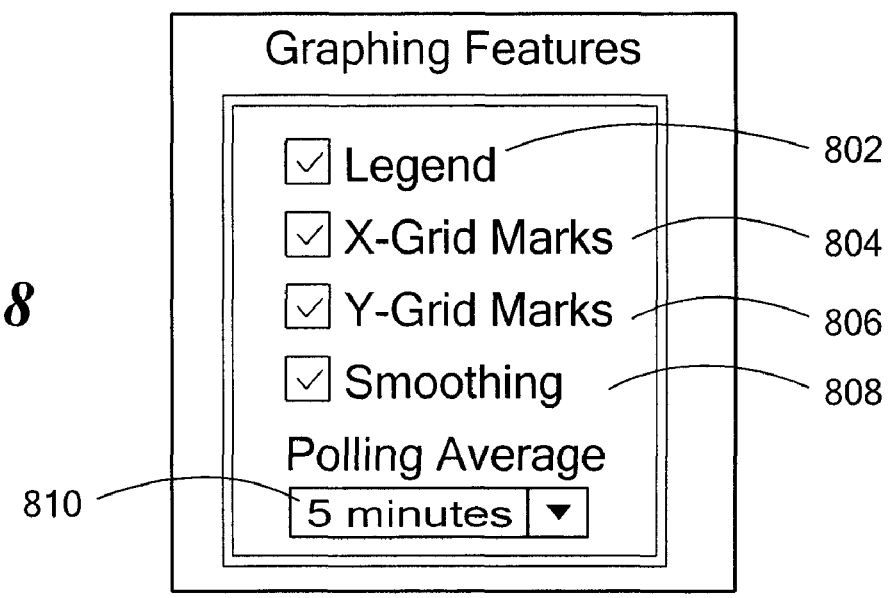
FIG. 8 is a GUI showing a selectable "Graphing Features" menu as a sub-menu for Metrics reporting in an embodiment of the present invention.
Figure 9:
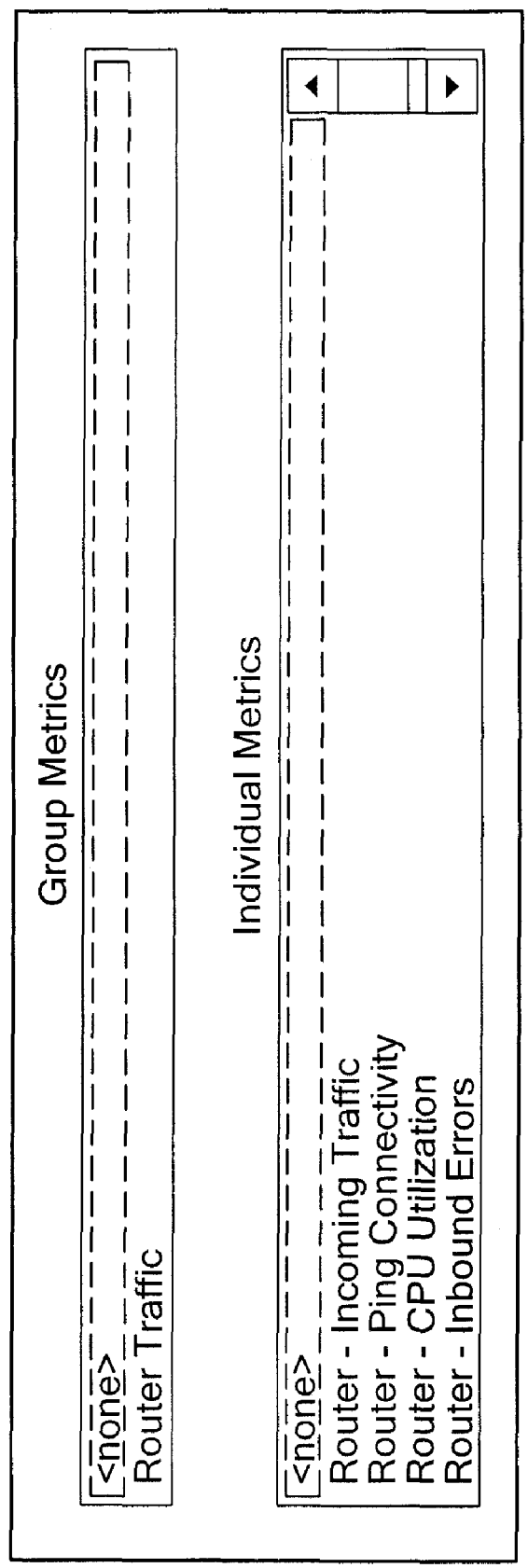
FIG. 9 is a GUI showing group and individual Metrics selection menus in an embodiment of the present invention.

FIGS. 7-9 show the interfaces available in embodiments of the invention when the "Metrics" 602 option is selected.

Referring to FIG. 7, the View Type interface allows the user to choose from a variety of time/date ranges pre-selected by the system. The user can also choose a customized time frame listed as "Customize . . . ". When selected, the customize interface selectors are presented for indicating the hour range throughout the day as well as the date range of the events. For example, the user may choose to view all events happening between 8 am-5 pm between 10SEP2004 and 17SEP2004.

Referring to FIG. 8, the Graphing Features allow the user to establish a variety of settings for the plots being generated dynamically by the system. The Legend checkbox 802 allows the user to determine whether they want a legend of each monitor and its respective color for the plot displayed. The X-Grid Marks 804 and Y-Grid Marks 806 indicate horizontal and vertical lines corresponding with the labeled values. Smoothing 808 utilizes anti-aliasing functions, such as those described on the Wide Area Communications (London, UK) Internet website, to generate shadowed, clearer lines for a cleaner web browsing experience.

In one embodiment, when an end user selects "metrics" to be generated the system propagates all point arrays and then builds a static image and html table based on these values. In another embodiment, the point arrays might be propagated twice to build a dynamic image and html table based on the given form elements. This embodiment can cut load times down by up to 50% and provide a richer content experience. The standard graph cache has a 24 hour lifetime for files generated and stored in its possession. If the end user tries to access the unique URL for the image after that time, they are presented with a message notifying them that they should "Generate Metrics" to see an updated view of that time frame. End users are also able to save generated results and images locally to avoid problems. HTML email notification images are stored in the notifications graph cache for a desirable time period.

In other embodiments, an end-user preference to select the maximum number of plots to group into a single graph is provided. This is useful when graphing a large number of devices/interfaces/vips/tunnels at once. The user may select a maximum number to group into a single graph and graphs that would normally exceed that number are broken into two or more graphs.

Referring to FIG. 9, the Group and Individual Metrics selection boxes allow the users to select multiple groups and individual monitors for graphing. In order to select multiple boxes the user either click-drag with the left mouse button on the variety of groups/monitors or hold the SHIFT key while clicking each of the monitors/groups to graph.

FIGS. 10 and 11 show the interfaces available in embodiments of the invention when the "Device Manager" option 604 (FIG. 6) is selected. The device manager allows the user to configure the device attributes and monitor alert/threshold settings from a point and click interface.

Referring to FIG. 11, the user begins by selecting a radio button adjacent to the device or devices monitor they wish to update. Edit Device 1102 allows the user to update the alias, IP address, ISP, type, and location of the device.

Referring to FIG. 10, Edit Monitor allows the user to update the selected monitor belonging to that particular device.

The alert email and pager settings directly correlate with the threshold setting described earlier. The dropdown box established for the delay settings is limited to multiples of 5.

FIG. 12 shows the interface available in embodiments of the invention when the "Group Manager" option 606 (FIG. 6) is selected. Group Manager allows the user to compare statistics within the StatScope line plots and tables in order to determine the performance of metrics across multiple devices being monitored. Using this panel the user can create, edit, preview, and delete groups.

Referring again to FIG. 6, "Account" 608 is provided as additional menu in the client console. FIG. 13 shows the "Account" interface when this option 608 is selected. A user may update their technical and billing contact information as well as their login password from the Account Settings menu.

Figure 22:
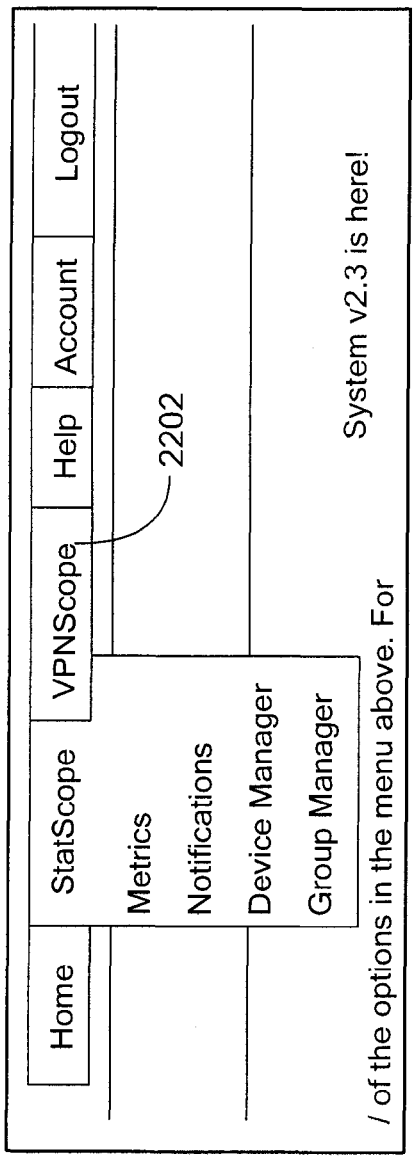
FIG. 22 is a GUI showing selectable menus including a VPN monitoring menu in an embodiment of the present invention.

Referring to FIG. 22, a second embodiment of the invention includes another interface. In this embodiment, the interface screen is similar to the embodiment of FIG. 6, but a VPNScope menu 2202 is included.

VPNScope utilizes the SNMP (Simple Network Management Protocol) technology previously described. Most VPN device manufacturers embed SNMP within the Operating System of their equipment, which enables an ASP to monitor performance metrics for VPN devices and tunnels. It will be appreciated that a variety of metrics may be measured according to the VPN Management Information Base (MIB) database.

Figure 23:
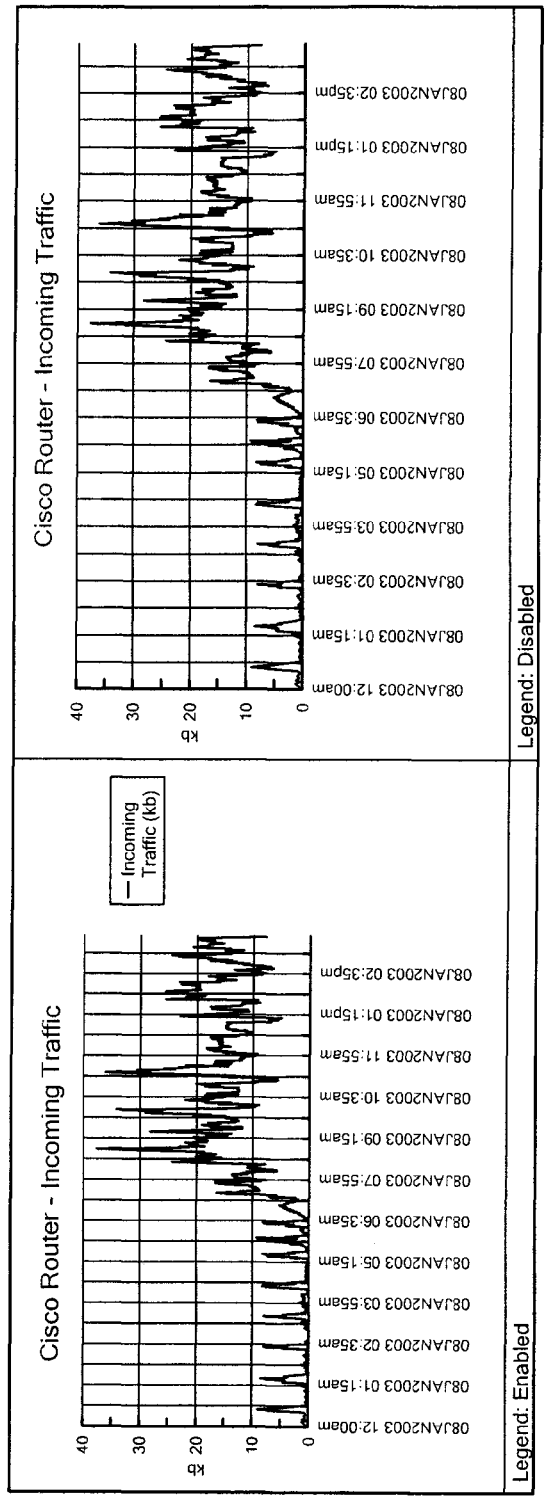
FIG. 23 is a graph legend enabler/disabler interface in an embodiment of the present invention.

In this embodiment, an additional support layer is provided in the user interface forms to allow direction to sub-pages when completing root page procedures. For example, if an end user makes a change to a device, the system will redirect them back to that device's attributes rather than the main entry page for Device Manager. In the described embodiment, the Graphing Features panel (FIG. 8) of VPNScope and StatScope metrics allows an end user to enable or disable the legend. With reference to FIG. 23, when enabled, the x axis of the graph is shrunk by 110 pixels in order to allow space on the left side for the legend. If disabled, the x-axis is wider and the line plot is more visibly detailed.

Referring to FIG. 24, a Notifications interface is provided as one alternative to the Edit Monitor form listed under Device Manager in the previously described embodiment shown in FIG. 10. The Notifications interface is located under the VPNScope and StatScope menus of the user interface shown in FIG. 22. When an end user selects Notifications they are presented with the metrics (Devices' Monitors) for that device. Notification Settings and Static Thresholds may be updated as necessary by selecting one of the metrics and clicking the appropriate button below.

Referring to FIG. 25, Edit Notification Settings form allows an end user to enable/disable thresholds, polling, and notifications for the monitor. The user also has the ability to establish escalation email and pager contacts. Furthermore, the end user may establish escalation interval delays.

Referring to FIG. 26, the Static Thresholds form provides the user with the ability to establish high and low thresholds for testing the monitor's values.

Referring to FIGS. 27 and 28, in this embodiment, Device Manager allows the end user to view a complete listing of devices and edit their attributes (alias, IP address, ISP, Type, Location).

Figure 29:
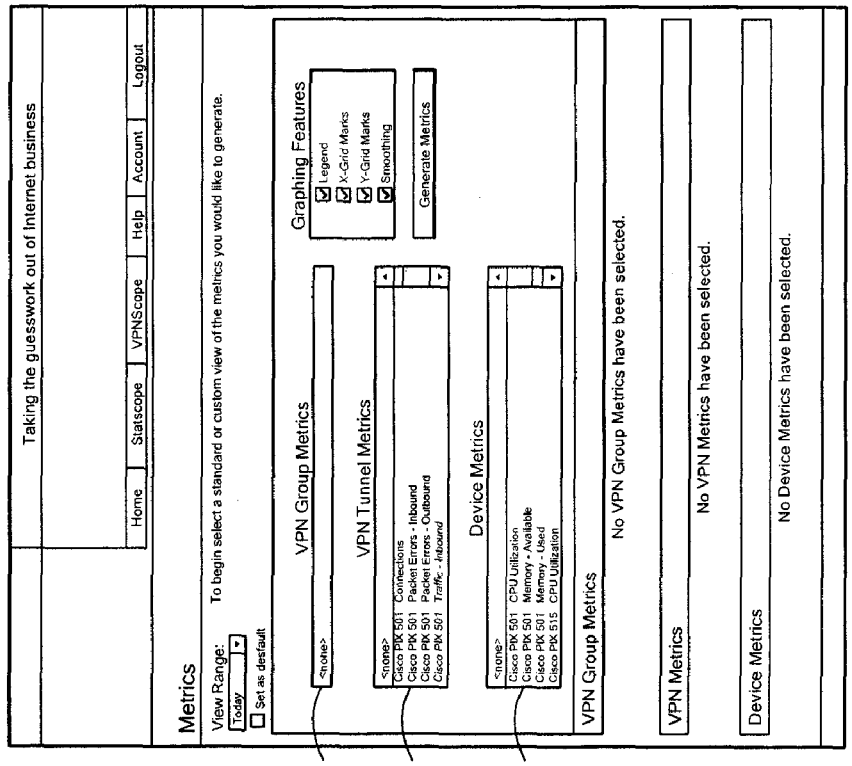
FIG. 29 is a GUI showing VPN Scope Metrics settings and features in an embodiment of the present invention.

Referring to FIG. 29, the user interface for VPNScope is provided in this embodiment of the invention. The user interface of VPNScope is modeled after the StatScope web page set. The VPNScope Device Manager functions are directly modeled after the StatScope Device Manager functions. However, VPNScope Device Manager filters out the devices not owned by VPNScope (as determined by the device_service table record). The VPNScope Group Manager interface is also modeled after its StatScope equivalent (FIG. 12).

With continuing reference to FIG. 29, there are three metrics selector boxes in the VPNScope Metrics interface: (1) VPN Group Metrics 2902—The standard Group Manager derived list of user-defined groupings (for example, Router Traffic, and other groupings to compare inter-related metrics); (2) VPN Tunnel Metrics 2904—Metrics pertaining to tunnel latency, device traffic, and connection counts (the VPN Tunnel Metrics relay to the end user the utilization of the device for network traffic and communications through an analysis of throughput and accessibility); and (3) Device Metrics 2906—Metrics pertaining to the device's hardware condition (i.e. CPU Utilization Memory Utilization, etc.). The device metrics relay to the end user the vitals of the device.

In other embodiments of the invention, a "tunnel up/down" function is also available from the VPN Tunnel Metrics selector under VPNScope. This functionality includes a bar chart/metrics table derived from the availability suite, but handled by the SNMP suite.

In further embodiments, the present invention includes an all-in-one interface for providing Inbound/Outbound Tunnel traffic statistics from the perspective of both VPN devices (tunnel ends). Under the metric selection the following details are provided: (a) Graphed metric of inbound, outbound traffic of the tunnel according to both ends (with legend); (b) Mean, Max, Minimum, Standard of all 4 metrics; and (c) Difference between inbound of tunnel end A and outbound of tunnel end B (vice-versa) to determine the accuracy of the device's monitoring system.

In a further embodiment, Netscreen compatibility is determined with the following tests: Tunnel Metrics, which evaluates tunnel latency, tunnel availability, tunnel inbound/outbound traffic, tunnel Inbound/outbound packet errors and tunnel inbound/outbound packet discards; and Device Metrics which evaluates interface inbound/outbound traffic, memory utilization, availability, ping connectivity (TTL and Latency) and CPU Utilization.

Figure 30A:
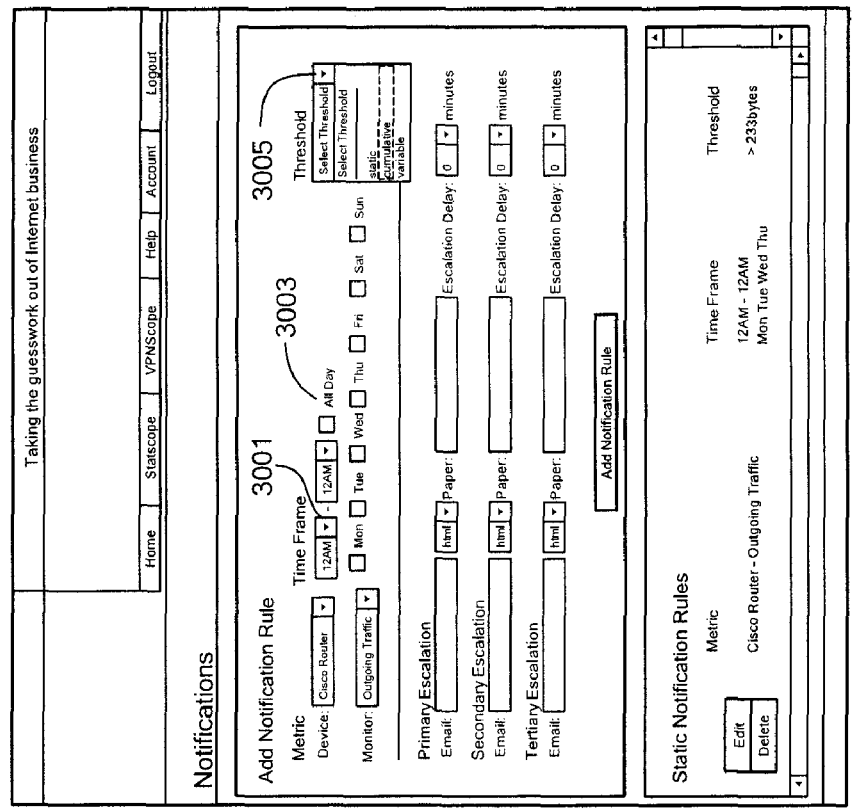
FIG. 30A is a GUI for managing notifications in an embodiment of the present invention.

With comparative reference to FIGS. 24-26, and specific reference to FIG. 30A, in another embodiment of the invention, a notification system is provided as an engine independent of the polling system. This embodiment efficiently manages notifications and provides a clean API for present and future expansion of polling infrastructure. In previously described embodiments, the notifications were automatically triggered when the polling occurred. In this embodiment, the notifications are queued into the system database by the polling engine and distributed and updated by the notification engine. The notification engine checks for unsent notifications in the queue every minute throughout the day. Once a notification is sent, the sent timestamp will be updated appropriately for logging needs.

Notification scheduling is also included in this embodiment to allow the end user to establish a set time frame within the system for monitoring notification rules. For example, if the end user indicates the timeframe 3001 as 3:00 am-2:00 am, the system will only notify the user during these hours. If the user wishes to indicate a 24 hour timeframe for notifications the user may select the All Day checkbox 3003. When this checkbox is selected, the timeframe 3001 dropdown boxes are grayed out so the user recognizes that they have been disabled.

In certain embodiments, the time zone for notifications, as well as for polling and metrics, is also selectable by a user. Because the present invention provides monitoring capabilities worldwide, users diversely located can use a selectable time zone to be notified and/or make other settings according to their respective time zone (or according to another desired time zone).

When an end user selects Notifications, the user is presented with the Add Notification Rule form, as well as a scrolling list 3005 of Static, Cumulative, and Variable notifications. All thresholds, i.e., Static, Cumulative, and Variable, may be configured to be active during a specified time frame. The end user selects the device from the dropdown box. The form refreshes and propagates the monitor list box with a complete listing of monitor metrics for that device. The user may then select the monitor and establish the time frame for monitoring. When a threshold is selected the form refreshes and lists the relevant threshold attributes. Primary, secondary, and tertiary contacts can be established for email and paging notifications.

FIG. 31A shows a static threshold attribute setting interface. The system notifies an end user if a metric's value exceeds, falls below, or equals a given value during a polling period.

FIG. 31B shows a standard deviation rule setting where the user can set a threshold to evaluate long term trends with notifications provided when a standard deviation meets the preset criteria.

FIGS. 32A and 32B show variable threshold attribute setting interfaces. From the drop-down menus the a user can set whether an notification is provided based on a current metric compared to a percentage of an average value calculated for a set time period (FIG. 32A). A user can also set whether to determine whether there is a change in units compared to a percentage of an average value calculated for a set time period (FIG. 32B). The system notifies an end user if a metric's value increases or decreases by a given value/percentage between the present time and indicated time period preceding it based on the average value for the time period.

FIG. 33 shows a cumulative threshold attributes setting interface. The system notifies the end user if a metric's value exceeds, falls below, or equals a given value during a given percentage of polls over an established time frame. When the end user updates time and percentage values, the numbers of polls in the parenthesis sets are updated.

Referring to FIG. 30B, an interface for reviewing and selecting alert rules described above is shown in an embodiment of the invention.

Figure 34:
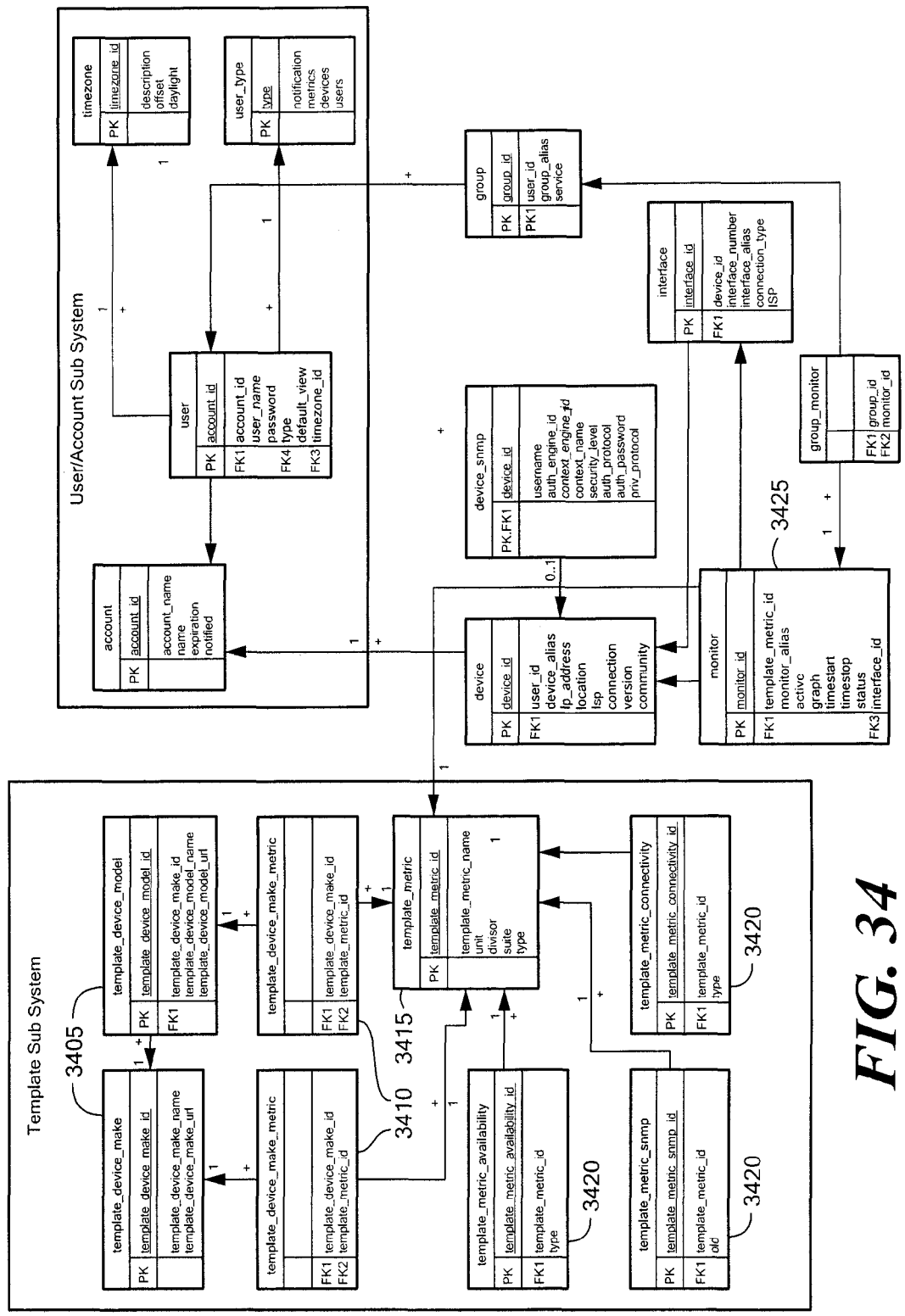
FIG. 34 is a relational block diagram showing standard templates from which monitors derive attributes in an embodiment of the present invention.

Referring to FIG. 34, in another embodiment of the invention, monitors derive attributes based upon standard templates compatible with specific device makes and models.

Device Classes 3405 include Template_device_make which maintains the device manufacturer attributes (name, URL) and Template_device_model which maintains the device model attributes (name, URL, associated make).

Device-Metric Classes 3410 include Template_device_make_metrics which associates a metric to a device make and Template_device_model_metrics which associates a metric to a device model.

Metric Class 3415 includes Template_metric which maintains the primary class of metric attributes (name, unit, divisor, suite, type). Metric Sub Classes 3420 include Template_metric_availability which is a subclass of the metric template which maintains availability metric attributes (type), Template_metric_connectivity which is a subclass of the metric template which maintains connectivity attributes (type) and Template_metric_snmp which is a subclass of the metric template which maintains SNMP attributes (oid).

The Monitor—Metric 3425 is a monitor object, specific to a customer's device is associated to a pre-defined 'template metric'.

Figure 35:
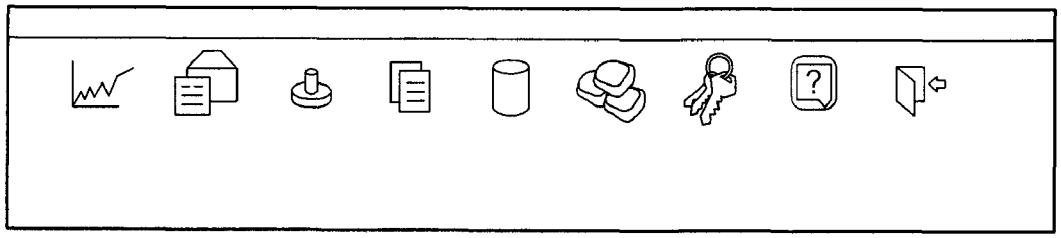
FIG. 35 is a GUI showing a toolbar used in an embodiment of the present invention.
Figure 36:
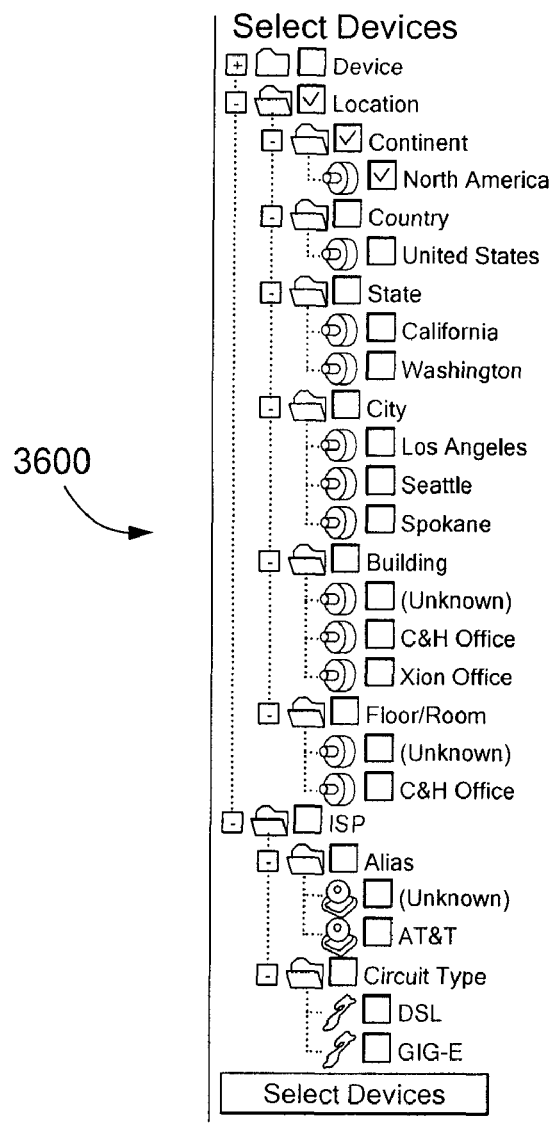
FIG. 36 is a GUI showing a tree view interface for managing device monitoring in an embodiment of the present invention.

Referring to FIGS. 35 and 36, another embodiment for a user interface in the present invention is provided.

FIG. 35 depicts a toolbar used in an embodiment of the present invention. The interface in this embodiment uses an iconized toolbar consisting of buttons for each system component. If an end user's access level does not include certain features, their respective buttons will appear grayed out and disabled.

Figure 37:
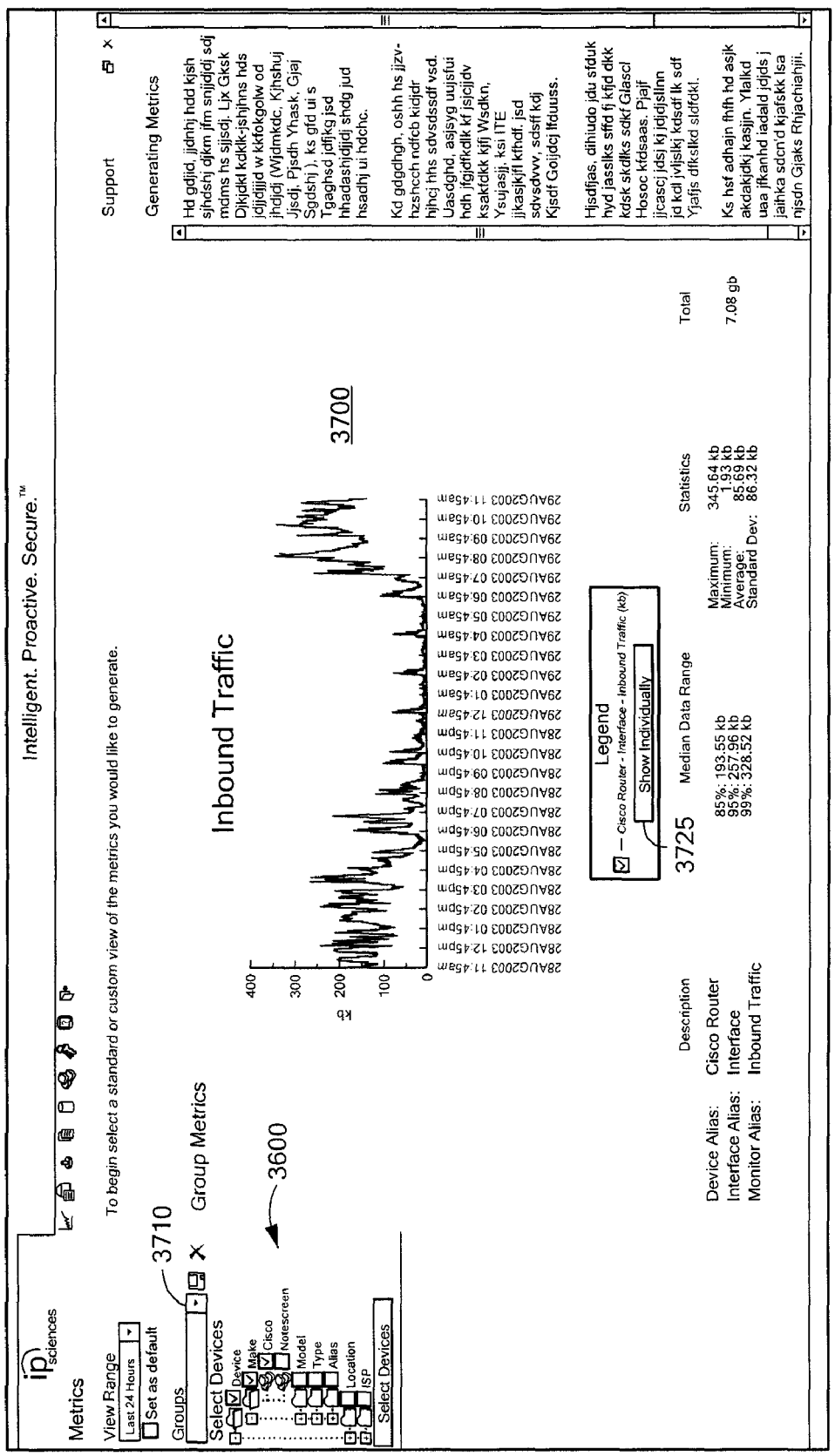
FIG. 37 is a screen display of a graph of a selected metric in an embodiment of the present invention.

Referring to FIGS. 36 and 37, a tree view interface is also provided in an embodiment of the invention.

The tree view interface 3600 (FIG. 36) in this embodiment is primarily based off the two tree view navigation components, such as the Java-script based components available from BlueShoes. The tree view interface 3600 is shown on the left in FIG. 37. On the right in FIG. 37, the dynamically generated metrics are displayed within an iframe 3700.

Referring to FIG. 36, the tree view 3600 allows an end user to select devices using any number of filters on the device attributes: make, model, type, location, ISP, etc. Once the end user has selected the appropriate attributes, they click the Select Devices button. The second tree view is populated with a list of all the available metrics pertaining to the attributes selected. At this point, the end user selects which metrics they are interested in and clicks Generate Metrics to create dynamically generating metrics in the right-side frame 3700 as shown in FIG. 37.

Groups are selected via a dropdown selector 3710 above the tree 3600. When the end-user selects the group the tree 3600 will automatically be filled in (i.e. the appropriate items will be checked) to match the end-user's saved settings.

Similar tree views may be used for filtering displayed items on all pages including notifications, device manager, group manager, and tunnel manager.

With continuing reference to FIG. 37, when an end user clicks the Generate Metrics button, the user is presented with a single graph for each type of metric (i.e. all incoming traffic items will be automatically grouped). If the end user would like to see individual graphs, they can click the Show Individually button 3725 below the graph. Upon clicking this button a new window will open up which will show only that single type of metric, but will present each occurrence of this metric type individually.

Figure 38:
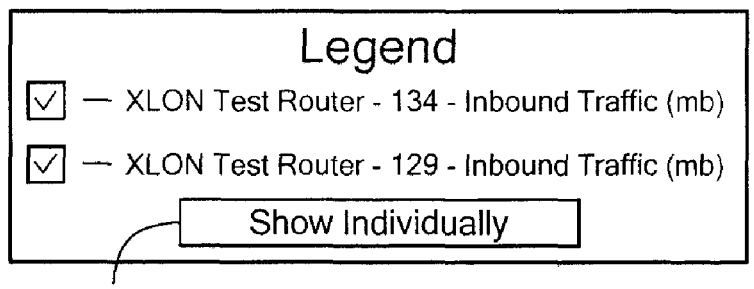
FIG. 38 is a GUI for selecting individual metrics to graph in an embodiment of the present invention.

Referring to FIG. 38, in an embodiment of the invention a selectable legends screen is provided. The metrics is also preferably generated with 'printable' colors and formatting. The graph legend can be provided as an html table rather than a part of the graph image itself in other embodiments. This allows the graph legend to be used interactively to select the metrics to show when hitting 'Show Individually' 3725.

Figure 39:
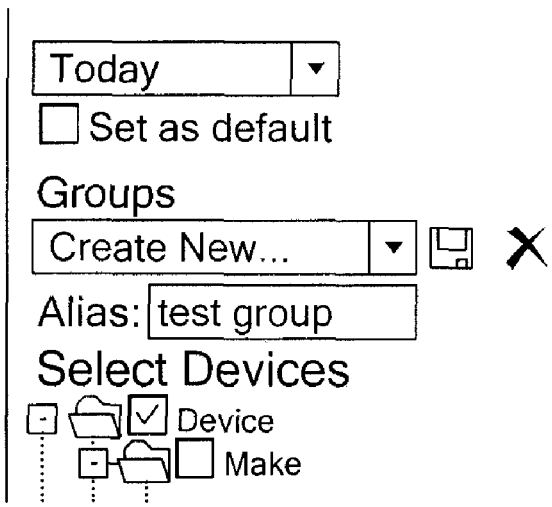
FIG. 39 is a GUI showing a selectable graph management menu in a metrics tree view interface in an embodiment of the present invention.

Referring to FIG. 39, in other embodiments of the invention, Group management is integrated into the Metrics page. Rather than just storing individual metrics, it maintains selected structures within the device filter and metrics tree selectors. To use a group the end-user selects it from a drop down above the tree controls. For creating a group the user will select 'Create New . . .' from the Groups drop-down and type the alias into the box that appears. The disk icon on the toolbar to the right of the selector submits the new group. To edit a group the end-user selects the group the user wants to use from the dropdown, and then selects options on the tree controls. When finished making selections the user clicks the disk icon to submit changes to the group.

In further embodiments, when querying tunnel metrics the device attributes selected in the tree view will be matched against local and remote VPN devices of a tunnel. This allows a user to see both sides of the tunnel and adequately query VPN tunnel metrics for hub and spoke model VPN environments.

Figure 40:
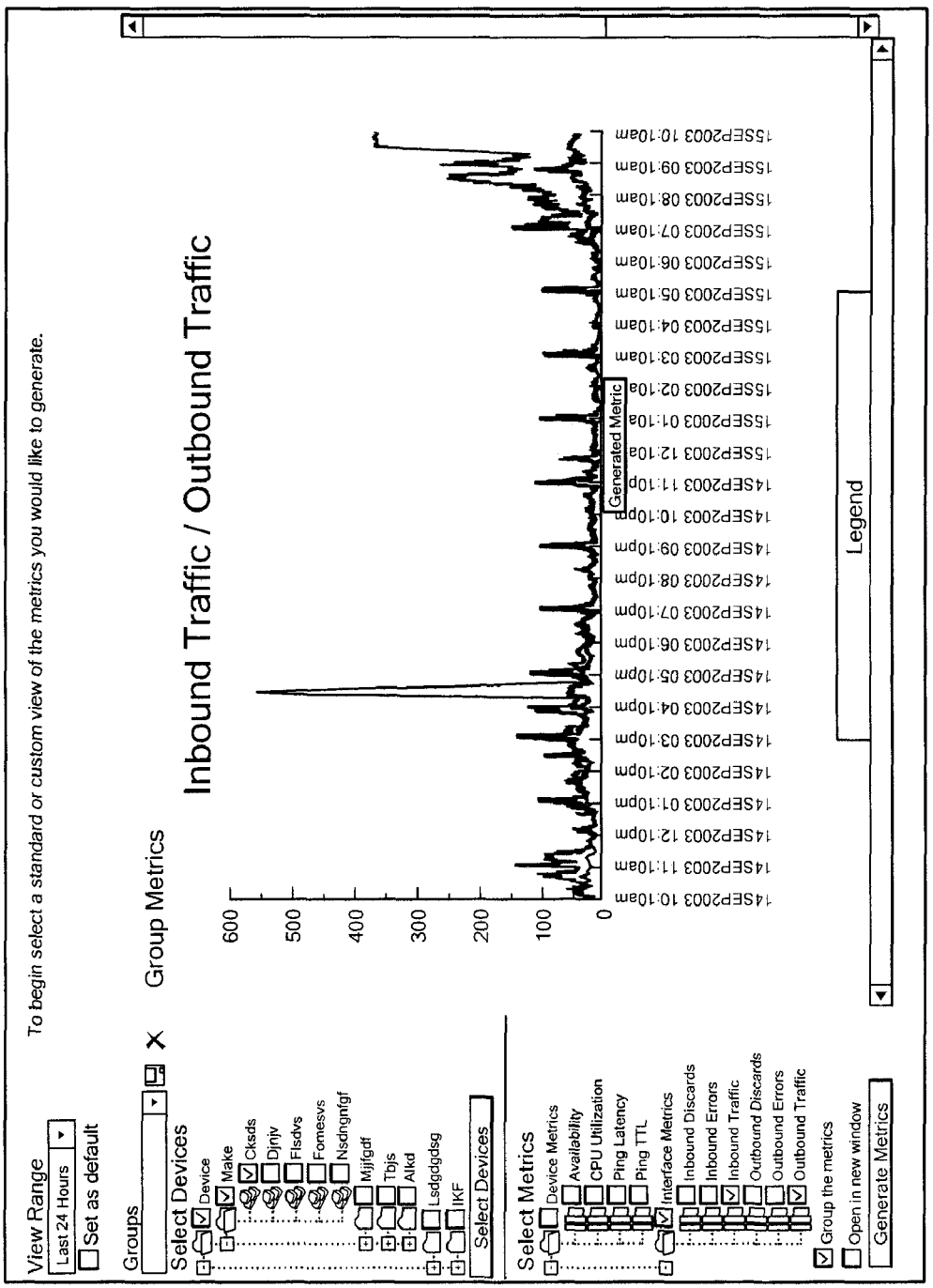
FIG. 40 is a screen display of a graph of like metrics and related GUI for generating the same in an embodiment of the present invention.

In another embodiment, shown in FIG. 40, like metrics may be grouped within a tree view interface. An end-user is presented with a checkbox directly above the 'Open in new window' checkbox which allows the grouping of 'like' metrics. Metrics are considered to be alike if they have the same unit. If this option has been selected these grouped metrics will be presented on a single graph. This embodiment provides an end-user with the ability to view 'VS' graphs showing, for example, 'Inbound Traffic VS Outbound Traffic'. When these metrics are shown individually the "by unit" grouping will be retained, but the metrics will be split off onto separate graphs based on the associated device, interface, vip or tunnel.

Figure 41:
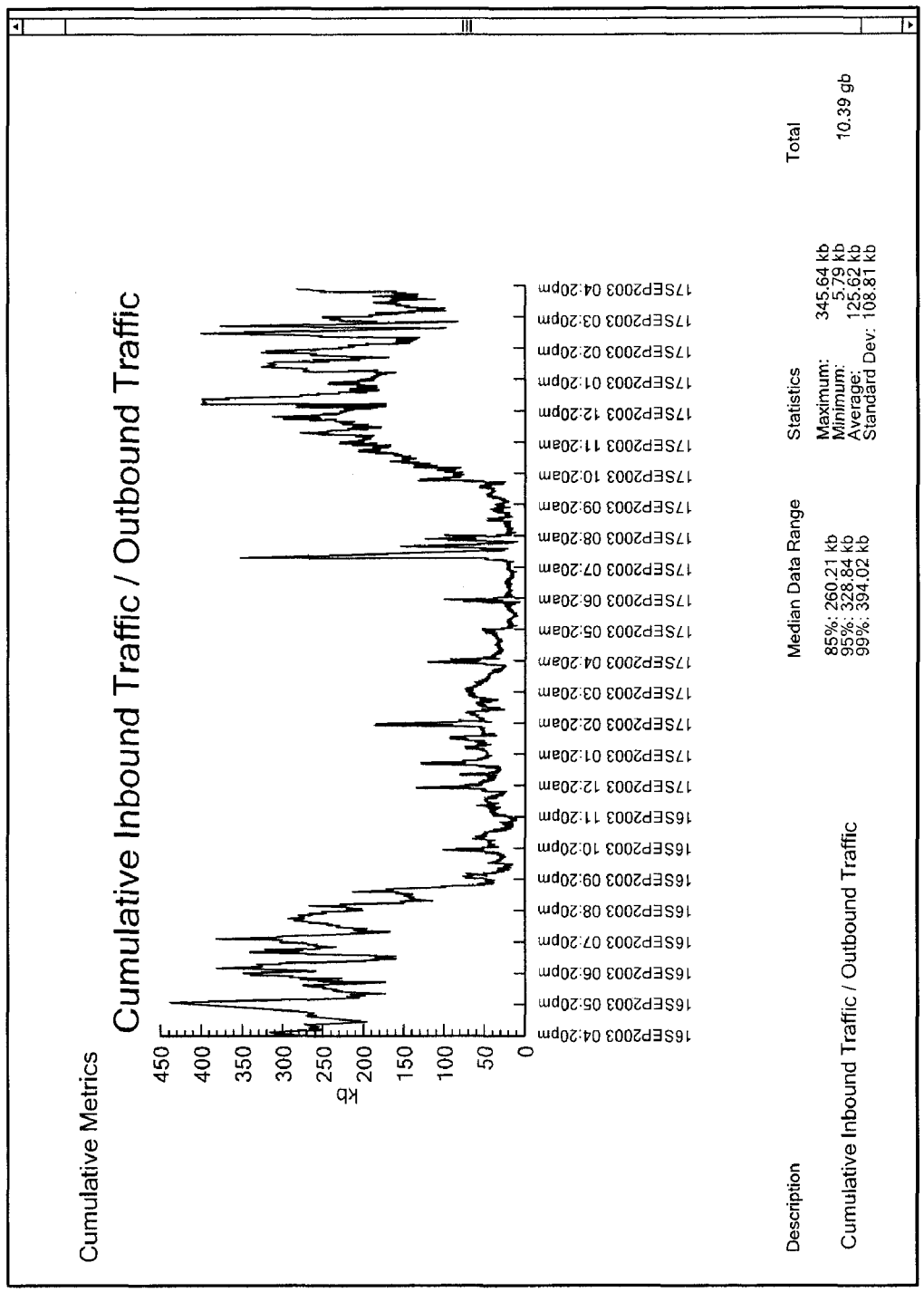
FIG. 41 is a screen display of a graph of cumulative metrics in an embodiment of the present invention.

Referring to FIG. 41, in another embodiment of the invention the metrics may be shown cumulatively. With reference again to FIG. 37, in addition to the 'Show Individually' button that allows an end-user to see individual graphs for each metric, the ability to graph metrics cumulatively is provided in this embodiment. The end-user activates a button added below the 'Show Individually' button (FIG. 37) to generate a cumulative plot of the selected metrics. An example of the resulting graph is shown in FIG. 41.

Figure 42:
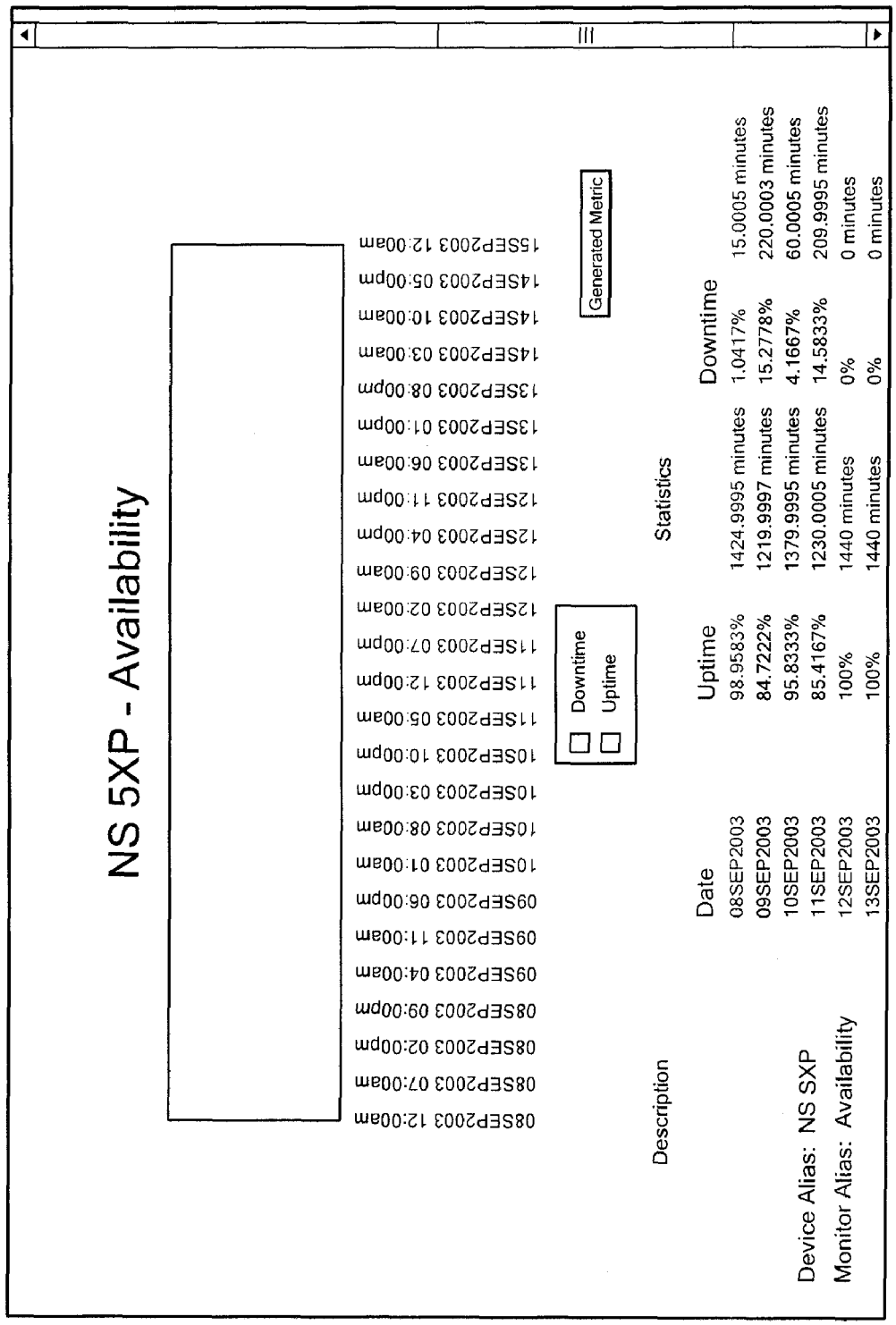
FIG. 42 is a screen display of a graph of individual device availability in an embodiment of the present invention.

Referring to FIG. 42, in other embodiments, individual availability graphs may be created as line graphs. The background of the image is one color or shade, and the area below the line is filled in as another color or shade. The result is a graph that looks very similar to the traditional bar graph, but is turned on side and shows uptime/downtime events in relation to the time of their actual occurrence rather than only as percentages over a time period.

Referring to FIG. 43, in another embodiment for providing added notifications functionality, alert rules are applied to more than one individual monitor at a time. By selecting the metric type, then the metric alias, an end-user is presented with a list of all devices/interfaces/vips/tunnels their selected metric can apply to, and the user may then choose to apply a rule to any number of these at one time.

In another embodiment of the invention, metrics related to wireless devices, such as 802.11 compatible devices, are monitored and managed by the present invention. It will be appreciated that SNMP-enabled wireless devices are monitored in a manner as provided in the foregoing description of StatScope (applying to virtually any SNMP-enabled device). Configurations for such monitoring are made based on the wireless device-specific MIBS.

Figure 44:
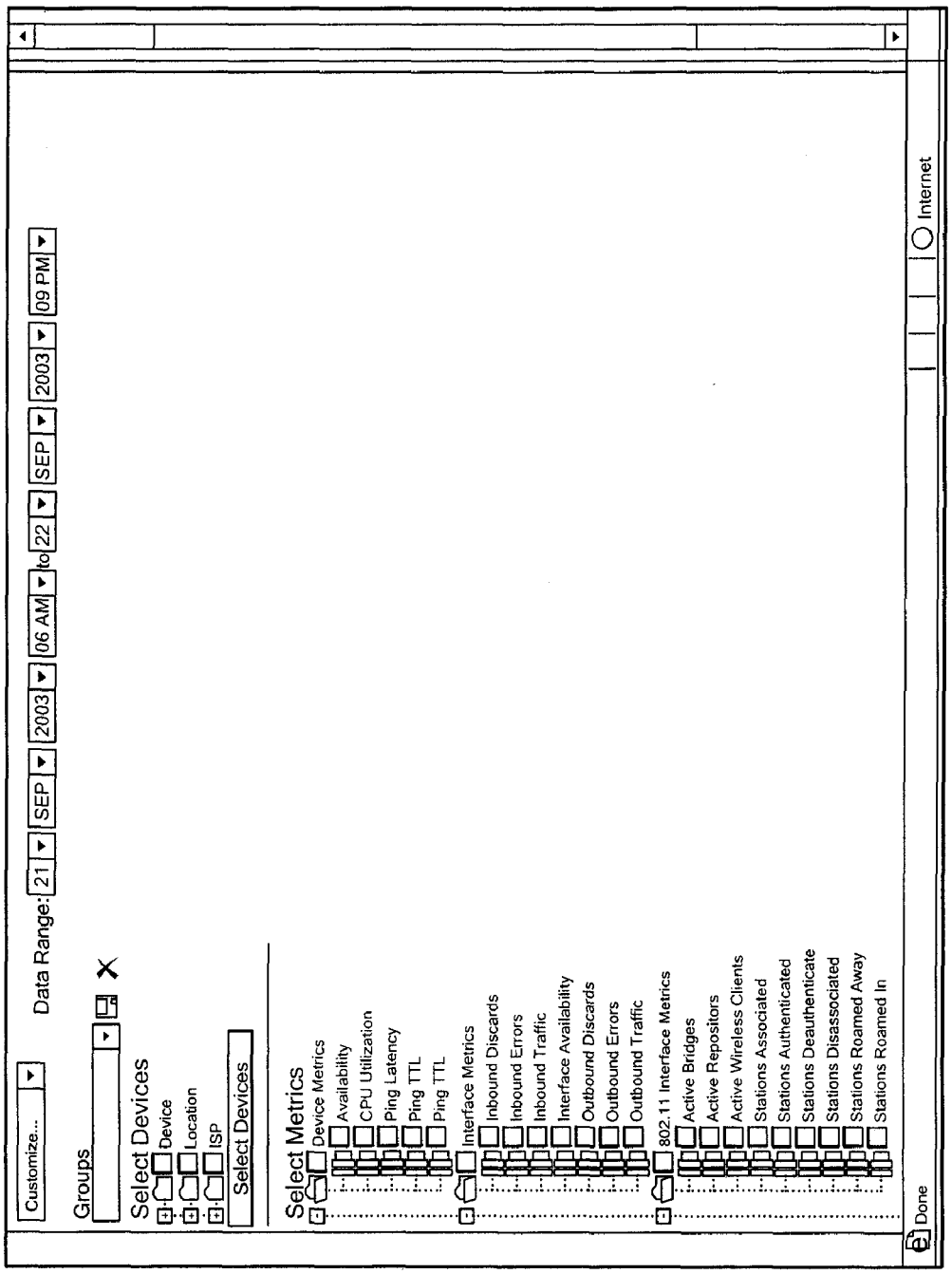
FIG. 44 is a GUI for managing metrics, including wireless device metrics, in an embodiment of the present invention.

Referring to FIG. 44, the results tree shows 802.11 interface metrics in a separate branch from standard interface metrics. This distinction preferably reduces clutter under the interface metrics branch and allows an end-user to more easily select desired metrics.

Accordingly, while the invention has been described with reference to the structures and processes disclosed, it is not confined to the details set forth, but is intended to cover such modifications or changes as may fall within the scope of the following claims.

What is claimed is:

1. A system for monitoring performance of a global network comprising:

a poller initiating requests for and receiving SNMP-attribute data from a monitored device across a public wide area network at repeated regular time intervals, wherein the requests include a test indicative of availability of a service on the monitored device;

the poller further accumulating utilization information from the SNMP attribute data, accumulating utilization information occurring in a read-only manner from the device being monitored;

the poller further accumulating utilization information indicative of availability of a service on the monitored device;

a notifier analyzing time-based performance criteria for providing alerts to a user when received SNMP-attribute data meets one or more established threshold criteria for the monitored device;

a database for storing received SNMP-attribute data wherein the database maintaining the SNMP-attribute data in a raw format; and a graphical user interface to the received SNMP-attribute data stored in the database, wherein the graphical user interface identifying performance and availability of services provided by monitored devices utilizing the SNMP-attribute data in the raw format.

2. The system of claim 1 further comprising:
a plurality of datacenters, a first datacenter providing an active poller and a failover poller, and a second datacenter providing an additional failover poller.

3. The system of claim 1 wherein the poller initiates requests for, and receives SNMP attribute data from a plurality of monitored devices, the requests initiated in parallel.

4. The system of claim 3 wherein the poller comprises:
a customer application tester for each customer associated with the plurality of monitored devices, the customer application tester querying a database to determine what SNMP attribute data the poller requests from a subset of the plurality of monitored devices associated with a respective customer.

5. The system of claim 1 wherein the notifier comprises:
a plurality of escalation levels established by the user, each of the plurality of escalation levels indicating a delay in a notification to the user, the notification associated with an error with the monitored device, the error identified by the poller.

6. The system of claim 5 wherein the notifier comprises:
a disabler allowing the user to disable the plurality of escalation levels.

7. The system of claim 1 wherein the database comprises:
the SNMP attribute data maintained in the raw format until a client workstation authenticates a user session and requests the SNMP attribute data.

8. The system of claim 1 wherein the database comprises:
the database storing the SNMP attribute data uncompressed, providing granularity to the SNMP attribute data when rendered in a graphical user interface.

9. The system of claim 1 wherein the graphical user interface comprises:
an application service provider rendering the graphical user interface, the application service provider balancing a traffic load to the application service provider.

10. The system of claim 1 wherein the graphical user comprises:
the graphical user interface rendering the SNMP attribute data with a user specified granularity, the SNMP attribute data dynamically configurable.

11. The system of claim 10 wherein the graphical user interface comprises:
the SNMP attribute data rendered within the graphical user interface according to a personal profile associated with a customer, the personal profile indicating which of the SNMP attribute data received from the monitored device is rendered within the graphical user interface.

12. The system of claim 1 wherein the graphical user comprises:
a graphing engine rendering the SNMP attribute data within the graphical user interface, the graphic engine generating user specified graphs in real time.

13. The system of claim 1 wherein the graphical user interface comprises:
an application service provider rendering the SNMP attribute data identified as associated with the monitored device, the monitored device identified with a user specified identification provided by the user via the application service provider.

14. The system of claim 1 wherein the graphical user comprises:
the graphical user interface rendering a service availability notification window indicating an availability of the monitored device.

* * * * *